(12) United States Patent
Kim et al.

(10) Patent No.: US 11,011,955 B2
(45) Date of Patent: May 18, 2021

(54) MOTOR

(71) Applicant: LG ELECTRONICS INC., Seoul (KR)

(72) Inventors: Jongsu Kim, Seoul (KR); Taehee Kwak, Seoul (KR); Jungwook Moon, Seoul (KR); Changhum Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 15/933,654

(22) Filed: Mar. 23, 2018

(65) Prior Publication Data
US 2018/0287452 A1    Oct. 4, 2018

Related U.S. Application Data

(63) Continuation of application No. PCT/KR2017/011308, filed on Oct. 13, 2017.

(Continued)

(51) Int. Cl.
*H02K 5/20* (2006.01)
*H02K 9/19* (2006.01)
(Continued)

(52) U.S. Cl.
CPC ............ *H02K 5/20* (2013.01); *H02K 9/19* (2013.01); *H02K 11/25* (2016.01); *H02K 11/30* (2016.01); *H02K 11/33* (2016.01)

(58) Field of Classification Search
CPC .......... H02K 5/20; H02K 9/193; H02K 9/197; H02K 11/25; H02K 11/30
(Continued)

(56) References Cited

U.S. PATENT DOCUMENTS

| 2,867,376 A | * | 1/1959 | Keir | ........................ F04C 29/02 |
| | | | | 417/228 |
| 4,854,373 A | * | 8/1989 | Williams | .............. F04D 29/588 |
| | | | | 165/46 |

(Continued)

FOREIGN PATENT DOCUMENTS

| DE | 102014212998 A1 * | 1/2016 | ................ H02K 5/20 |
| DE | 10 2015 205 141 | 9/2016 | |

(Continued)

OTHER PUBLICATIONS

Omori (JP 2016059109 A) English Translation (Year: 2016).*

(Continued)

*Primary Examiner* — Tulsidas C Patel
*Assistant Examiner* — Robert E Mates
(74) *Attorney, Agent, or Firm* — KED & Associates LLP

(57) ABSTRACT

Disclosed herein is a motor including a shaft, a rotor, a motor housing forming an inner space to receive the shaft and the rotor therein, a stator received in the motor housing and disposed outside the rotor based on a radial direction of the shaft, a first flow path disposed outside the stator based on the radial direction of the shaft such that a first fluid flows in the first flow path, the first fluid being discharged to the inner space and cooling the stator and the rotor, and a second flow path disposed between the first flow path and the stator based on the radial direction of the shaft such that a second fluid flows in the second flow path, the second fluid absorbing heat of the stator transferred through a flow path wall.

13 Claims, 18 Drawing Sheets

Related U.S. Application Data

(60) Provisional application No. 62/477,451, filed on Mar. 28, 2017.

(51) Int. Cl.
*H02K 11/25* (2016.01)
*H02K 11/30* (2016.01)
*H02K 11/33* (2016.01)

(58) Field of Classification Search
USPC ...... 310/54, 58, 59, 60 A, 61, 64, 52, 53, 57
See application file for complete search history.

(56) References Cited

U.S. PATENT DOCUMENTS

| | | | |
|---|---|---|---|
| 5,038,853 A | | 8/1991 | Callaway, Sr. et al. |
| 2004/0163409 A1 | | 8/2004 | Nakajima et al. |
| 2005/0023909 A1 | * | 2/2005 | Cromas .................... H02K 9/19 310/58 |
| 2006/0174642 A1 | | 8/2006 | Nagashima et al. |
| 2009/0102298 A1 | * | 4/2009 | Savant ..................... H02K 5/20 310/52 |
| 2013/0119793 A1 | | 5/2013 | Hofkirchner et al. |
| 2013/0214624 A1 | | 8/2013 | Kubes et al. |
| 2013/0257197 A1 | * | 10/2013 | Buttner ................. B60L 3/0061 310/54 |
| 2014/0077633 A1 | * | 3/2014 | Nagao ..................... H02K 5/20 310/54 |
| 2014/0339934 A1 | * | 11/2014 | Yoshiizumi .............. H02K 9/19 310/54 |
| 2016/0056683 A1 | * | 2/2016 | Nakanishi .............. H02K 11/33 310/54 |
| 2016/0164377 A1 | | 6/2016 | Gauthier et al. |

FOREIGN PATENT DOCUMENTS

| | | | | | |
|---|---|---|---|---|---|
| JP | H 04-185262 A | | 7/1992 | | |
| JP | H 10-210701 A | | 8/1998 | | |
| JP | 2004-260898 | | 9/2004 | | |
| JP | 2006-197781 A | | 7/2006 | | |
| JP | 2006187105 A | * | 7/2006 | | |
| JP | 2010263715 A | * | 11/2010 | ........... | B60L 3/0061 |
| JP | 2010283929 A | * | 12/2010 | | |
| JP | 2013-162674 | | 8/2013 | | |
| JP | 2016-059109 | | 4/2016 | | |
| JP | 2016059109 A | * | 4/2016 | | |
| KR | 10-2011-0089716 A | | 8/2011 | | |
| WO | WO 2013/118703 A1 | | 8/2013 | | |
| WO | WO 2015/087707 A1 | | 6/2015 | | |

OTHER PUBLICATIONS

Arai (JP 2006187105 A) English Translation (Year: 2006).*
Yamaguchi (JP 2010283929 A) English Translation (Year: 2010).*
Miyagawa (JP 2010263715 A) English Translation (Year: 2010).*
Weisbecker (DE 102014212998 A1) English Translation. (Year: 2016).*
International Search Report dated Feb. 20, 2018 issued in Application No. PCT/KR2017/011308.
European Search Report dated Jul. 26, 2018 issued in Application No. 18164251.3.
European Office Action dated Nov. 22, 2019 issued in Application 18 164 251.3.
Japanese Office Action dated Nov. 10, 2020 issued in Application 22019-553440.

* cited by examiner

FIG. 1
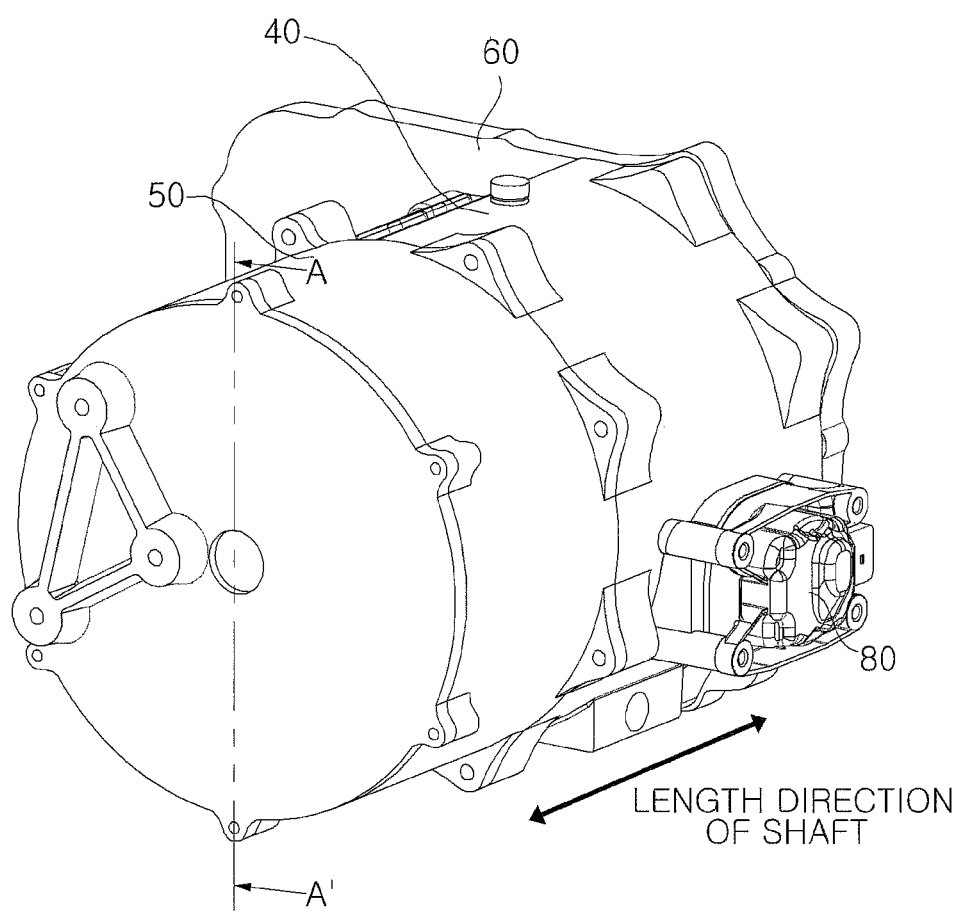
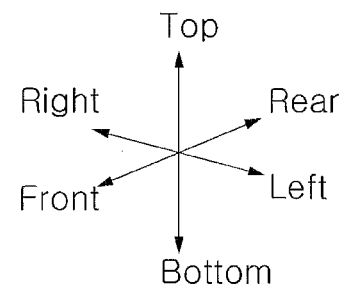

FIG. 2
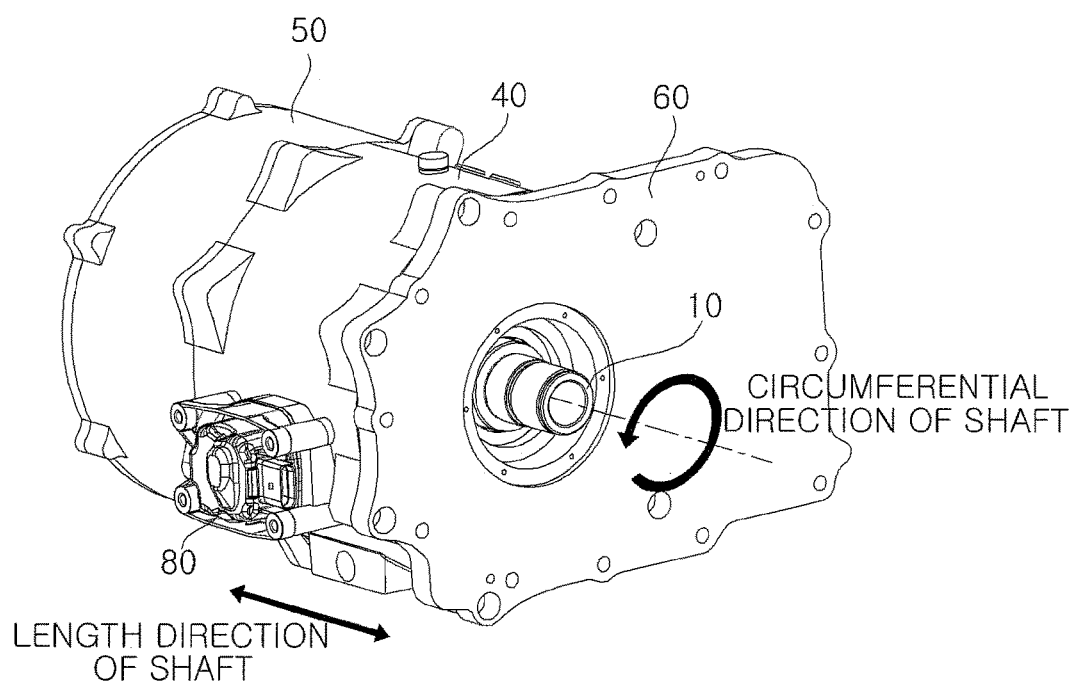
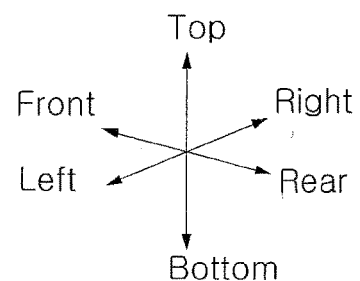

MOTOR

CROSS-REFERENCE TO RELATED APPLICATION(S)

This application claims the priority benefit of the U.S. Patent Provisional Application No. 62/477,451, filed Mar. 28, 2017, and PCT Application No. PCT/KR2017/011308, filed Oct. 13, 2017, in the Korean Intellectual Property Office, the disclosure of which is incorporated herein by reference in its entirety.

BACKGROUND

1. Field

The present disclosure relates to a motor having a cooling structure.

2. Background

In general, a motor includes a rotor, a stator core covering the surroundings of the rotor, and a coil wound on the rotor or the stator core.

Hereinafter, a motor in which a coil is wound on a stator core will be exemplarily described. In the motor, in order to provide driving power to a rotor, current flows through the coil. When current flows through the coil, an electromagnetic field is formed, force in a designated direction is applied to magnets in the rotor by the electromagnetic field and, thus, the rotor is rotated.

When current flows to the coil of the stator, the stator core or the coil of the stator generates heat. Therefore, methods to dissipate such heat of the motor have been developed.

An indirect cooling method in which a motor housing is cooled using cooling water and thus a stator in a motor is cooled has been used. Also, a direct cooling method in which oil is injected into a motor housing and thus directly cools a stator, a coil, etc., have been used. Further, a motor provided with both an oil cooling path and a cooling water cooling path has been used.

According to recent technical trends, although heating of motors becomes more serious as the motors are miniaturized and RPMs are increased, a structure which may effectively provide cooling performance is not yet developed.

BRIEF DESCRIPTION OF THE DRAWINGS

Embodiments will be described in detail with reference to the following drawings in which like reference numerals refer to like elements, and wherein:

FIG. 1 is a perspective view of a motor in accordance with one embodiment of the present disclosure, as seen from one side;

FIG. 2 is a perspective view of the motor in accordance with the embodiment of the present disclosure, as seen from the other side;

DETAILED DESCRIPTION

Figure 3:
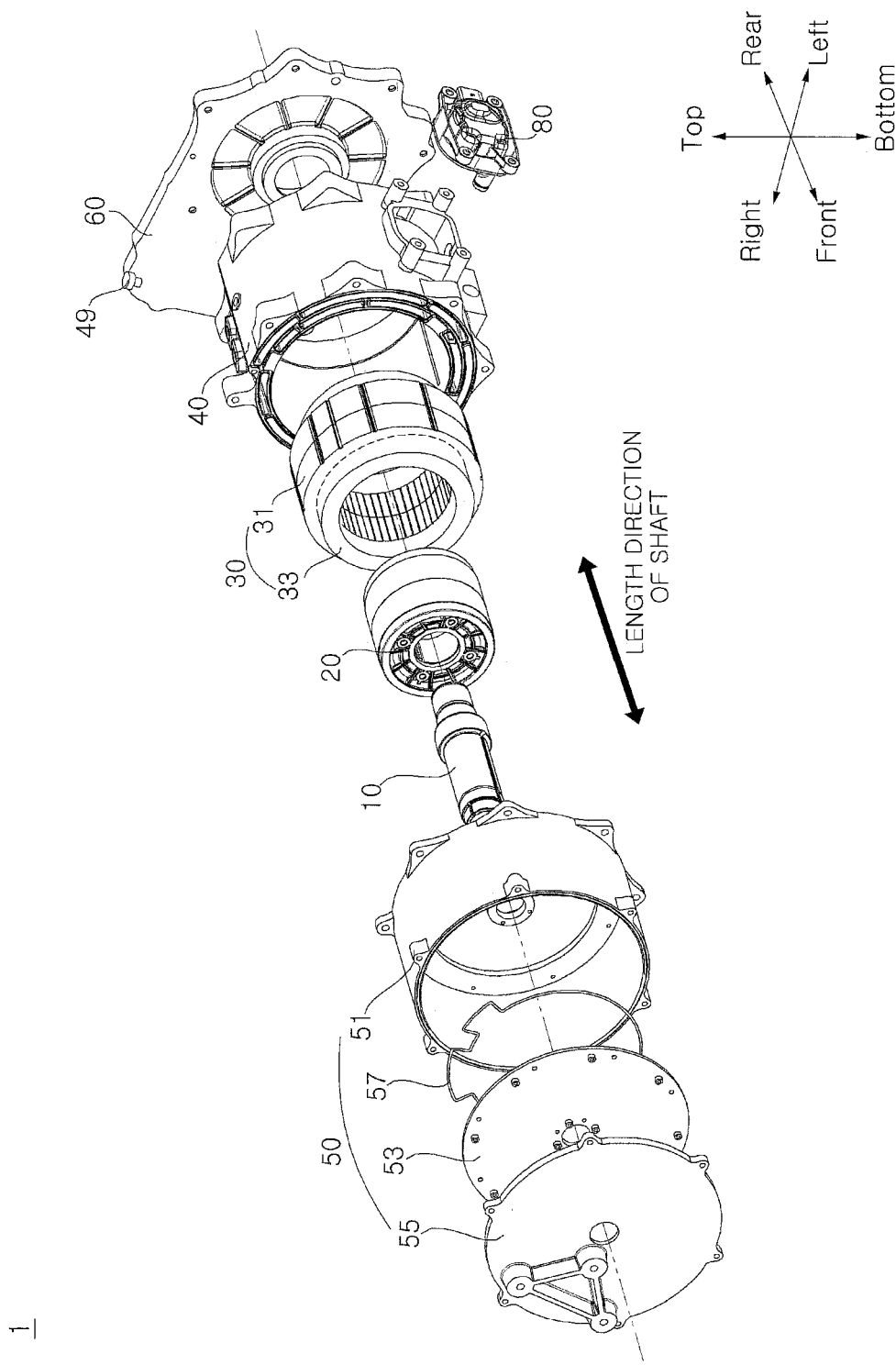
FIG. 3 is an exploded perspective view of the motor in accordance with the embodiment of the present disclosure, as seen from one side.

Reference will now be made in detail to embodiments of the present disclosure, examples of which are illustrated in the accompanying drawings. The same reference numbers may be used to refer to the same or like parts. The suffixes "module" and "unit" used in the description below are given or used together only in consideration of ease in preparation of the disclosure and do not have distinctive meanings or functions. In the following description of the embodiments, a detailed description of known functions and configurations incorporated herein may be omitted. Further, the accompanying drawings are provided only for better understanding of the embodiments disclosed herein and are intended to cover all alternatives, modifications and equivalents and other embodiments within the spirit and scope of the disclosure.

Terms "first", "second", etc. may be used to describe various elements, but the elements are not limited by the terms. These terms are used only to discriminate one element from other elements.

In the following description of the embodiments, it will be understood that, when an element is "connected to" or "coupled with" another element, the element may be connected directly to or coupled directly with the other element or other elements may be interposed between both elements. However, it will be understood that, when an element is "directly connected to" or "directly coupled with" another element, no element may be interposed between such described elements.

It will be understood that singular expressions used in the following description encompass plural expressions, unless stated otherwise.

In the following description of the embodiments, terms "including", "having", etc. will be interpreted as indicating presence of a specific feature, number, step, operation, element or part stated in the description, or a combination thereof, and do not exclude presence of one or more other features, numbers, steps, operations, elements, parts or combinations thereof or possibility of adding the same.

Hereinafter, directions, such as top, bottom, left, right, front and rear, may be defined as described in the drawings. However, such definitions are made only for convenience of description and may be made differently.

With reference to FIGS. 1 to 4, the motor 1 may include a shaft 10, a rotor 20, a stator 30, a motor housing 40, a first flow path or passage 100 and a second flow path or passage 200. The shaft 10 may support the rotor 20 so as to be rotatable.

The motor 1 may be a motor for vehicles, encompassing cars, motorcycles, etc. Vehicles may include an internal combustion engine vehicle provided with an engine as a power source, a hybrid electric vehicle provided with an engine and an electric motor as power sources, and an electric vehicle provided with an electric motor as a power source, etc.

One end of the shaft 10 may be combined with a bearing. The shaft 10 may be supported by one side wall of motor housing 40 so as to be rotatable. The other end of the shaft 10 may be provided with a bearing. The shaft 10 may be supported by the other side wall of the motor housing 40 so as to be rotatable.

A front end of the shaft 10 may be combined with an inverter housing 51 combined with a front end of the motor housing or housing 40. A rear end of the shaft 10 may be combined with a rear plate combined with a rear end of the motor housing 40.

The shaft 10 may be provided with one or more protrusions to control position thereof within a casing assembly within the motor housing 40. The shaft 10 may have a shape having a plurality of stepped portions. When the motor 1 is operated, the shaft 10 is rotated and may thus generate heat due to friction. The rotor 20 may be rotated about the shaft 10. The rotor 20 may include a rotor core and magnets received in the rotor core. The rotor core may be combined with the shaft 10.

The rotor 20 may be combined with the shaft 10 while surrounding the outer circumferential surface of the shaft 10. The temperature of the rotor 20 may be raised due to heat generated from the inside of the rotor 20 or heat transferred from the shaft 10, when the motor 1 is operated.

The rotor 20 may be cooled by a cooling fluid, which will be described below.

The rotor 20 may be received in the motor housing 40. The stator 30 may include stator cores 31 and coils 33 wound on slits provided on the stator cores 31. The stator 30 may be received in the motor housing 40. The stator 30 may be disposed at the outside of the rotor 20 based on a radial direction of the shaft 10.

Figure 5:
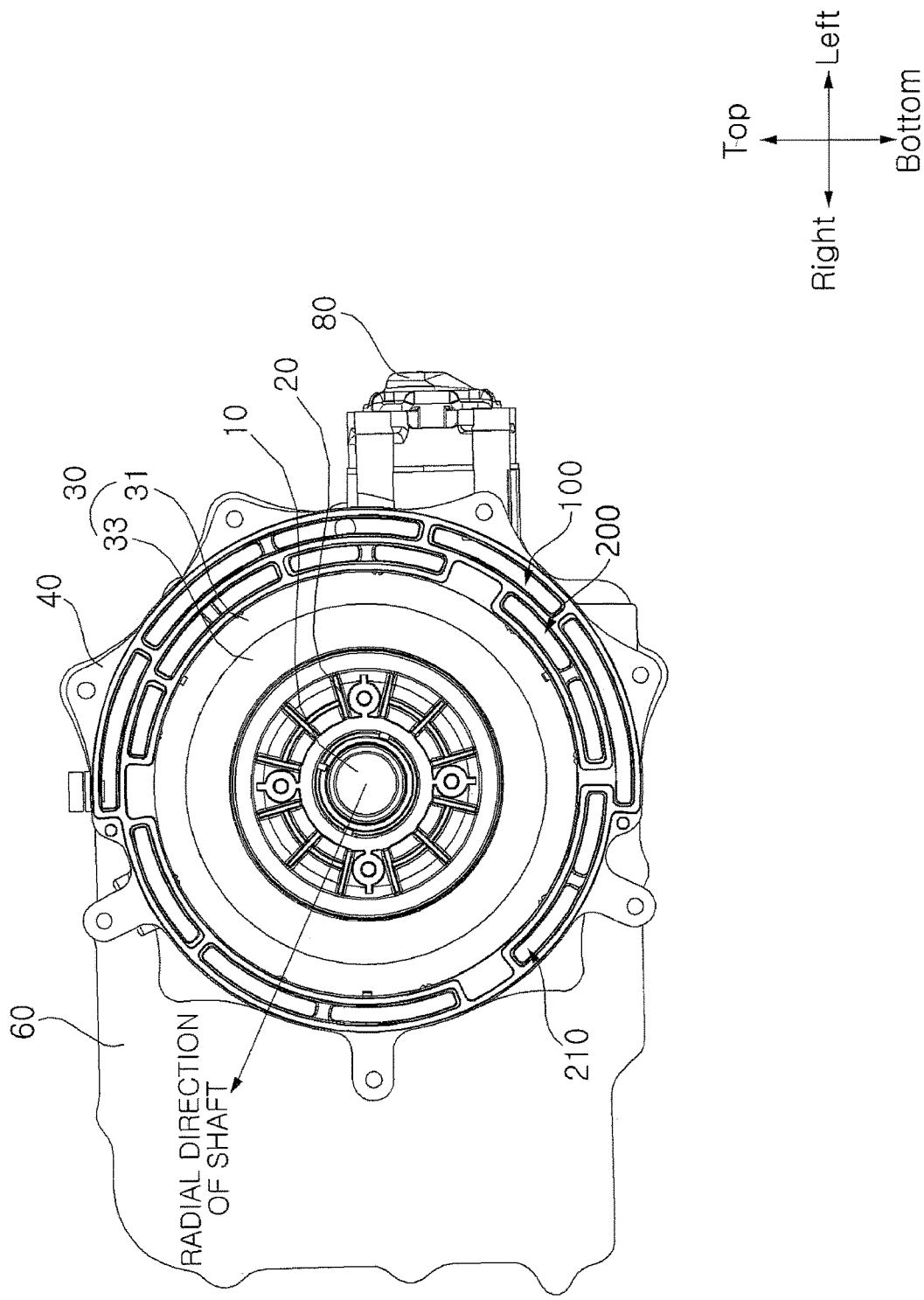
FIG. 5 is a view illustrating the motor of FIG. 1, from which an inverter casing is removed.

As shown in FIGS. 1 and 5, the radial direction of the shaft 10 may be defined as a direction from the center of the shaft 10 to the outer diameter of the shaft 10. The stator 30 may be disposed to surround the outer circumferential surface of the rotor 20. The stator 30 may be combined with the inner surface of the motor housing 40.

The temperature of the stator 30 may be raised due to heat transferred from the coils 33 or heat generated from the stator 30, when the motor 1 is operated.

The stator 30 may be directly or indirectly cooled by cooling fluid. The cooling fluid may directly contact the stator 30 and thus cool the stator 30, or may indirectly absorb conduction heat or other heat from the stator 30 by a thermal conductor and thus cool the stator 30.

The stator 30 may be formed by combining a plurality of stator cores 31.

The outer surfaces of the stator cores 31 may be adhered to the inner circumferential surface of the motor housing 40. The temperature of the stator cores 31 may be raised due to thermal energy transferred from the coils 33 and thermal energy generated from the stator cores 31, when the motor 1 is operated. The stator cores 31 may have contact surfaces with the motor housing 40 and may thus exchange thermal energy with the motor housing 40 through thermal conduction.

The stator cores 31 may be provided with grooves engaged with protrusions formed on the inner circumferential surface of the motor housing 40 and, thus, coupling force between the stator cores 31 and the motor housing 40 may be provided. The coils 33 may be wound on the slits provided on the stator cores 31. The coils 33 may protrude from both sides of the stator cores 31. The coils 33 form a magnetic field with the magnets provided in the rotor 20 and may thus provide driving force to the rotor 20.

When the motor 1 is operated, current flows to the inside of the coils 33 and the temperature of the coils 33 may be raised. The coils 33 may transfer thermal energy generated by the coils 33 to the stator cores 31.

In accordance with embodiments, the coils 33 may be wound on the rotor 20. The motor housing 40 may form an external appearance of the motor 1. The motor housing 40 may form an inner space in which the shaft 10 and the rotor 20 are received.

The shaft 10, the rotor 20, the stator 30 and cooling fluids may be received in the inner space of the motor housing 40. The motor housing 40 may have a cylindrical shape having a hollow formed therein.

The motor housing 40 may be combined with a pair of cover members to cover both open sides or ends of the motor housing 40, thus forming the inner space.

The internal shape of the motor housing 40 may be the inner circumferential surface of a cylinder. The external shape of the motor housing 40 may be a polyprism other than a cylinder, or other shape.

FIG. 5 is a view illustrating the motor of FIG. 1, from which an inverter casing 50 is removed.

Figure 6:
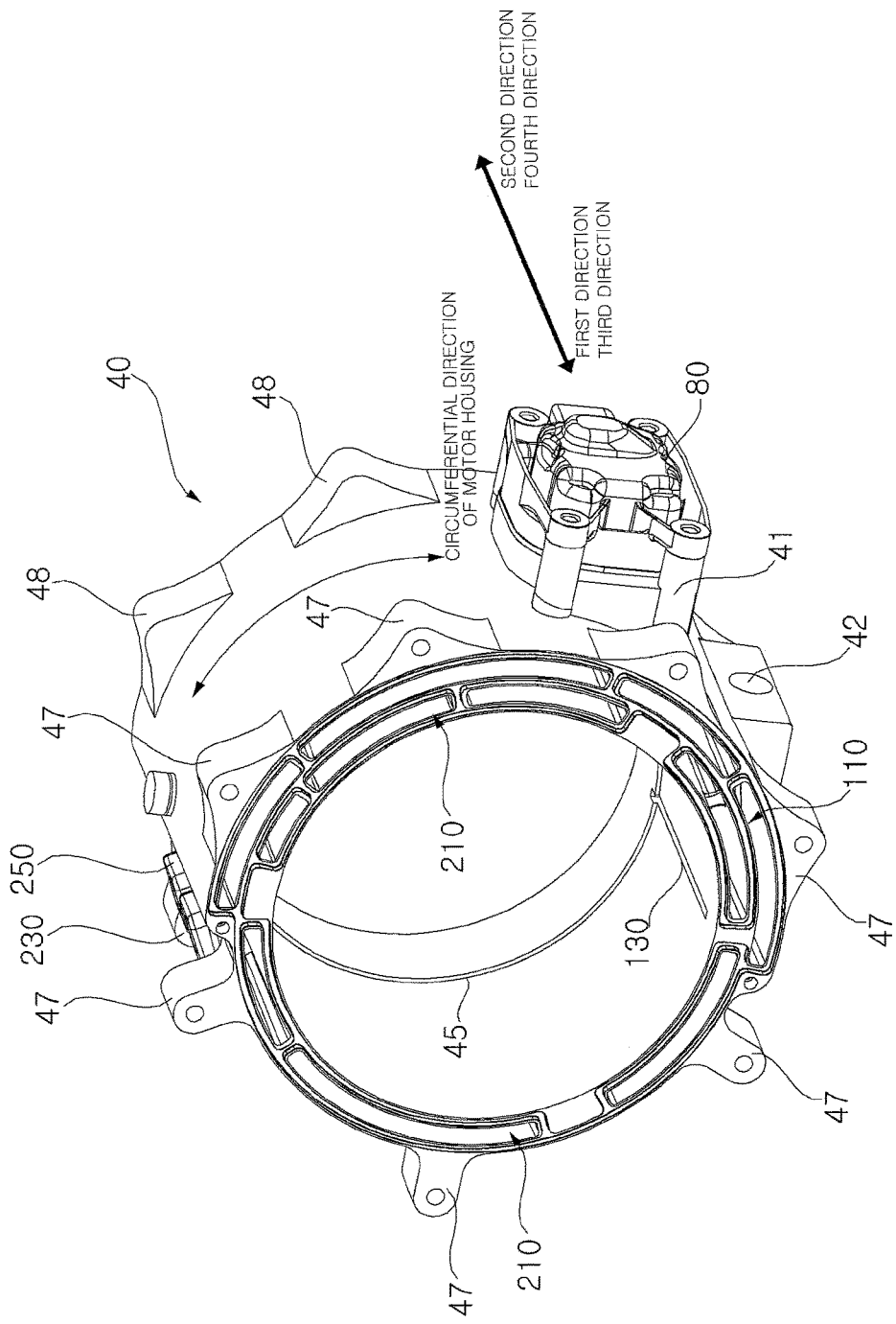
FIG. 6 is a perspective view of a motor housing of FIG. 1, as seen from one side.

FIG. 6 is a perspective view of the motor housing 40 of FIG. 1, as seen from one side.

With reference to FIGS. 5 and 6, a first flow path 100 and a second flow path 200 may be formed between the inner circumferential surface and the outer circumferential surface of the motor housing 40.

The motor housing 40 may be combined with a pair of cover members to cover both open sides or ends of the motor housing 40, thus forming the first flow path 100 and the second flow path 200. The motor 1 may include a front cover to cover one open side surface of the motor housing 40. The motor 1 may include a rear cover 60 to cover the other open side surface of the motor housing 40 opposite the side surface of the motor housing 40 covered by the front cover. The motor housing 40 may be combined with the front cover and the rear cover 60 and thus form a first flow path 100 and a second flow path 200. In this embodiment, the front cover may be the inverter housing 51. A second heat exchanger 210 may be formed between the inner circumferential surface and the outer circumferential surface of the motor housing 40. The second heat exchanger 210 may exchange thermal energy with the stator 30.

A first heat exchanger 110 may be formed between the second heat exchanger 210 and the outer circumferential surface of the motor housing 40. The first heat exchanger 110 may exchange thermal energy with the second heat exchanger 210. A thickness of a diaphragm between the first heat exchanger 110 and the second heat exchanger 210 and a thickness of a diaphragm between the inner circumferential surface of the motor housing 40 and the second heat exchanger 210 based on or along the radial direction of the shaft 10 may be different.

As exemplarily shown in FIGS. 1 and 5, the radial direction of the shaft 10 may be defined as a direction from the center of the shaft 10 to the outer diameter of the shaft 10.

The motor housing 40 may effectively perform heat transfer through the diaphragm having a relatively small thickness between the first heat exchanger 110 and the second heat exchanger 210. Further, the motor housing 40 may have rigidity of a designated level due to the diaphragm having a relatively large thickness between the inner circumferential surface of the motor housing 40 and the second heat exchanger 210.

The first flow path 100 and the second flow path 200 will be described below. The motor housing 40 may be configured such that a part of the motor housing 40 provided with the first flow path 100 may protrude outward, as compared to a part of the motor housing not provided with the first flow path 100, based on the radial direction of the shaft 10.

With reference to FIGS. 5 and 6, a wall thickness of a left part of the motor housing 40 may be greater than a wall thickness of a right part of the motor housing 40. The wall thickness of the left part of the motor housing 40 may be greater than the wall thickness of the right part of the motor housing 40 by a thickness of the first flow path 100.

The motor housing 40 may be provided with a configuration that minimizes unnecessary volume or size. As a result, the motor 1 may have a compact structure.

In accordance with another embodiment, the motor housing 40 may be configured such that a part of the motor housing 40 provided with the first flow path 100 and a part of the motor housing not provided with the first flow path 100 may have the same thickness. In accordance with another embodiment, left and right parts of the motor housing 40 may have the same thickness. The motor housing 40 may have a configuration that is bilaterally symmetrical and, thus, the motor 1 may be structurally balanced.

Figure 7:
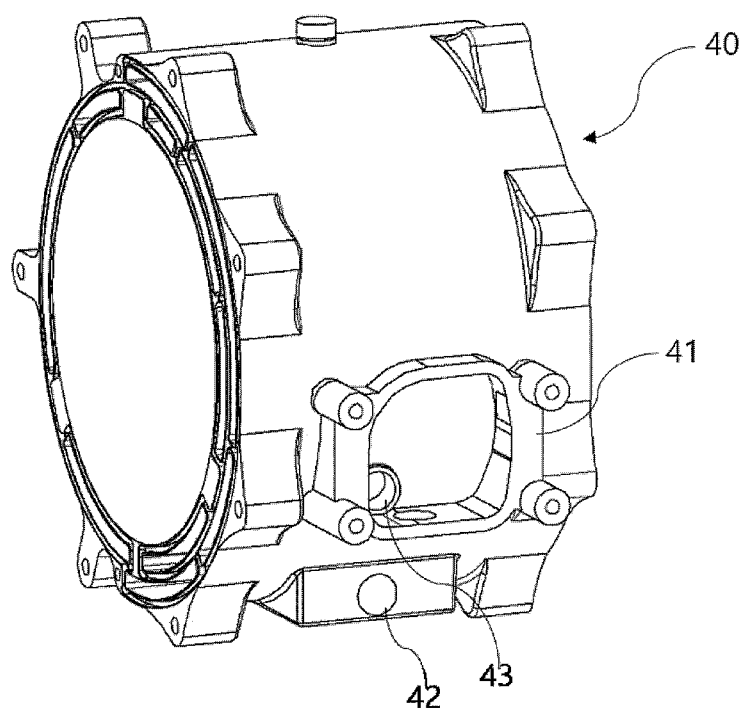
FIG. 7 is a view illustrating the motor housing of FIG. 6, from which an oil pump is removed.

FIG. 7 is a view illustrating the motor housing 40 of FIG. 6, from which an oil pump 80 is removed. The oil pump 80 may be disposed at one side of the outer circumferential surface of the motor housing 40. The oil pump 80 may be disposed at a left side or a right side of the outer circumferential surface of the motor housing 40.

With reference to FIGS. 6 and 7, the oil pump 80 may be disposed at a position between a middle region of the left side and the lower end of the left side of the outer circumferential surface of the motor housing 40. The motor housing 40 may be provided with a coupling part 41 formed on the outer circumferential surface thereof so as to be coupled with the oil pump 80. The oil pump 80 may be coupled with the motor housing 40 by inserting a part of the oil pump 80 into the coupling part 41. The motor housing 40 may be provided with a plurality of mating fastening parts fastened to a plurality of fastening parts of the oil pump 80.

The motor housing 40 may include an intake path 42 provided with one end communicating with a first heat exchanger cell 111-1 and the other end communicating with an inlet of the oil pump 80. The intake path 42 may extend to the outside of the motor housing 40.

The motor housing 40 may be provided with the intake path 42 which allows the inlet of the oil pump 80 and the first heat exchanger 110 to communicate with each other.

The intake path 42 may be formed as a hole provided with one end which communicates with the first heat exchanger 110 in the motor housing 40, and the other end which is open to the outside of the motor housing 40.

One end of the intake path 42 may communicate with the first heat exchanger 110 in the motor housing 40, and the other end of the intake path 42 may communicate with the inlet of the oil pump 80. The intake path 42 may communicate with the inlet of the oil pump 80 through a hose or a pipe. The intake path 42 may be disposed at the lower end of the motor housing 40 and extend to one side of the motor housing 40 where the oil pump 80 is disposed. The intake path 42 may be formed at a part of the outer circumferential surface of the motor housing 40, which protrudes outward, based on the radial direction of the shaft 10.

The motor housing 40 may include a discharge path 43 provided with one end communicating with a first heat exchanger cell 111-2 adjacent to the first heat exchanger cell 111-1 communicating with the intake path 42 and the other end communicating with an outlet of the oil pump 80. The discharge path 43 may extend to the outside of the motor housing 40.

The discharge path 43 may be provided within an inner space formed by the coupling part 41, which is coupled with the oil pump 80. The discharge path 43 may be formed as a tube protruding from the outer circumferential surface of the motor housing 40 to the oil pump 80. The discharge path 43 may be formed as a hole provided with one end which communicates with the first heat exchanger 110 in the motor housing 40, and the other end which is open to the outside of the motor housing 40. One end of the discharge path 43 may communicate with the first heat exchanger 110 within the motor housing 40, and the other end of the discharge path 43 may communicate with the outlet of the oil pump 80. The discharge path 43 may be directly connected to the oil pump 80, or be connected to the oil pump 80 by a hose or a pipe.

In accordance with another embodiment, a pair of oil pumps 80 may be combined with both sides of the motor housing 40. The first heat exchanger 110 may be formed at left and right sides of the motor housing 40 and, thus, oil may be pumped by a pair of the oil pumps 80.

With reference to FIG. 6, in order to guide a relative position of the stator 30 with the motor housing 40, a stepped portion 45 may be formed on the inner circumferential surface of the motor housing 40. The stepped portion 45 may be formed at a position of the inner circumferential surface of the motor housing 40 close to the rear end of the motor housing 40.

The motor housing 40 may be provided with a plurality of fastening parts 47 and 48 protruding outward from the outer circumferential surface of the motor housing 40 based on the radial direction of the motor housing 40. The fastening parts 47 and 48 may include front fastening parts 47 disposed at the front end of the motor housing 40 and serving to couple the motor housing 40 and the front cover with each other. The fastening parts 47 and 48 may include rear fastening parts 48 disposed at the rear end of the motor housing 40 and serving to couple the motor housing 40 and the rear cover 60 with each other.

The motor housing 40 may include an oil lid 49 to open and close an oil injection hole formed at the upper portion of the motor housing 40. The oil lid 49 may be fastened to the motor housing 40 by screw-coupling.

Hereinafter, with reference to FIGS. 5 to 12, the first flow path 100 and the second flow path 200 will be described. The first flow path 100 may be disposed at the outside of the stator 30 based on the radial direction of the shaft 10. The radial direction of the shaft 10 may be defined as a direction from the center of the shaft 10 to the radius of the shaft 10. The radial direction of the shaft 10 may be defined as the same direction as the radial direction of the motor housing 40.

The first flow path 100 may be formed between the inner circumferential surface and the outer circumferential surface of the motor housing 40. The first flow path 100 may be formed integrally with the motor housing 40. The first flow path 100 may be formed in the motor housing 40 by die casting. The first flow path 100 may be formed by combining inverter housing 51 and the rear cover 60 with the motor housing 40.

Figure 9:
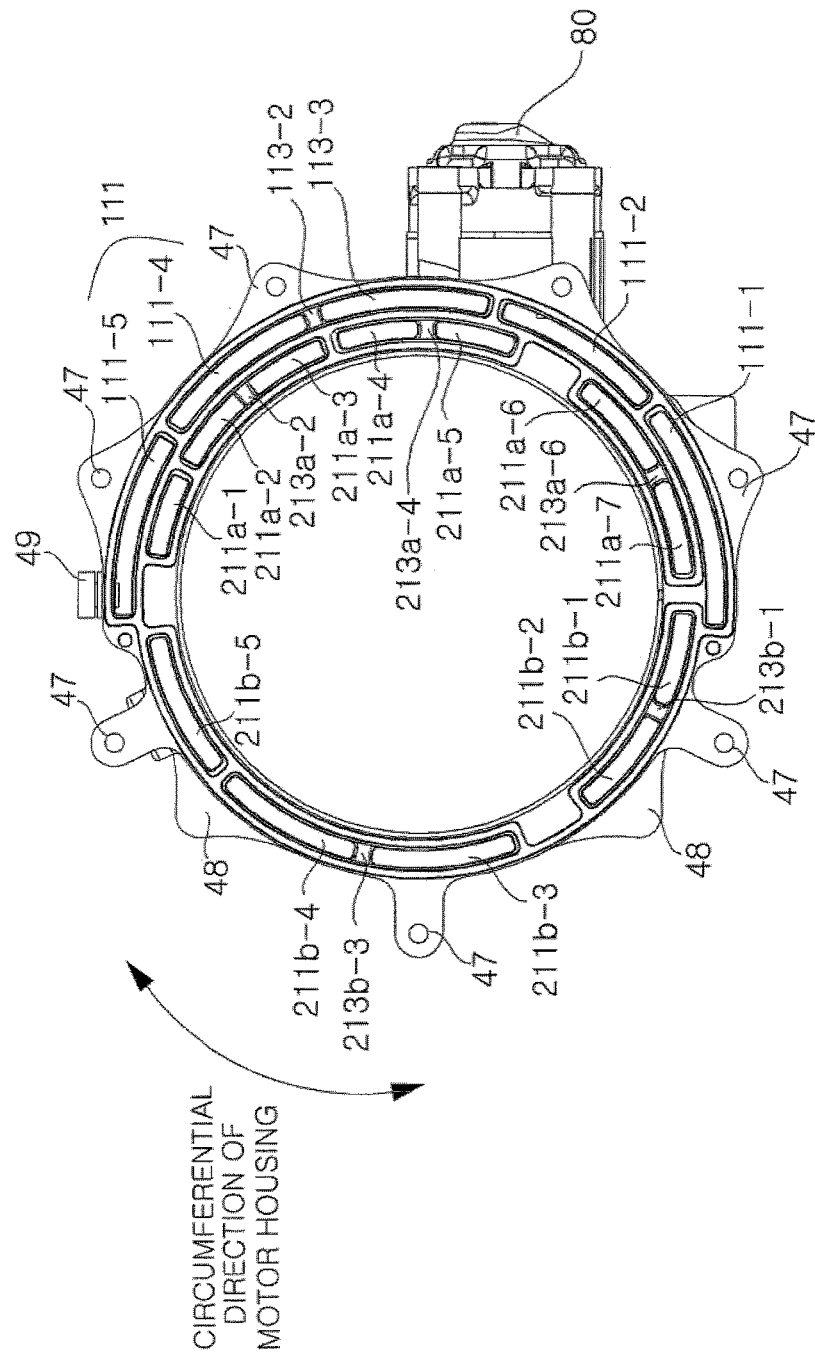
FIG. 9 is a front view of the motor housing of FIG. 1.
Figure 10:
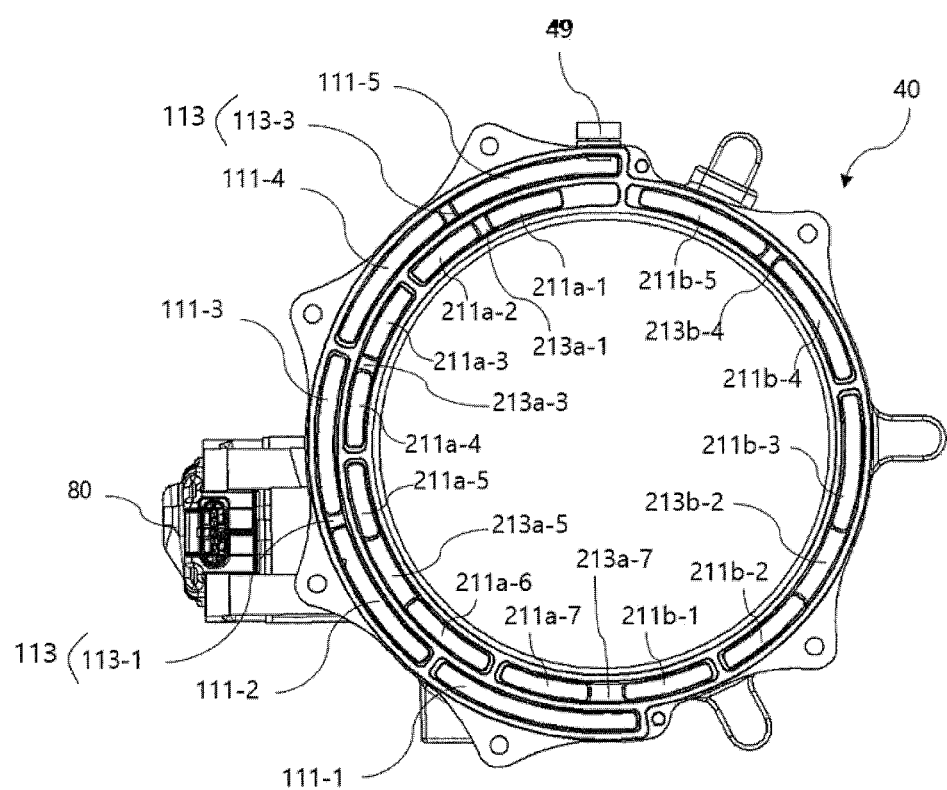
FIG. 10 is a rear view of the motor housing of FIG. 1.

With reference to FIGS. 6, 9 and 10, a part of the first flow path 100 may be formed by both sides of the motor housing 40, and the remaining part of the first flow path 100 is formed by combining the inverter housing 51 and the rear cover 60 with the motor housing 40.

A first fluid may flow within the first flow path 100. The first fluid may be discharged to the inner space of the motor housing 40 and thus cool the stator 30 and the rotor 20. The first fluid may be various of fluids, such as oil, air, etc., which may be circulated along the first flow path 100. The first fluid may be circulated along the first flow path 100 and exchange thermal energy with the first flow path 100 and members or components adjacent to the first flow path 100, which exchanges heat with the first flow path 100. The first fluid may be discharged to the inner space of the motor housing 40, directly contact the rotor 20 and the stator 30 and, as a result, exchange thermal energy with the rotor 20 and the stator 30. The first fluid may absorb heat from the rotor 20 and the stator 30 having a relatively high temperature and thus cool the rotor 20 and the stator 30. The first fluid may directly contact the rotor 20 and the stator 30. Accordingly, the first fluid may employ a material which effectively absorbs heat from the rotor 20 and the stator 30 without electrical interference with the rotor 20 and the stator 30.

Hereinafter, oil will be exemplarily described as the first fluid, but the present disclosure is not limited to oil.

With reference to FIGS. 6, 8, 9 and 10, the first flow path 100 may include the first heat exchanger 110 formed between the second heat exchanger 210 and the outer circumferential surface of the motor housing 40 and exchanging heat with the second heat exchanger 210.

The first heat exchanger 110 may be disposed at a more outside region of the motor housing than the second heat exchanger 210 based on the radial direction of the shaft 10. The first heat exchanger 110 may share an inner path wall thereof with the second heat exchanger 210, based on the radial direction of the shaft 10. That is, the inner path wall of the first heat exchanger 110 may be an outer path wall of the second heat exchanger 210. One side of the diaphragm between the first heat exchanger 110 and the second heat exchanger 210 may form one surface of a path of the first heat exchanger 110, and the other side of the diaphragm may form one surface of a path of the second heat exchanger 210. Oil flowing in the first heat exchanger 110 may exchange heat with a second fluid flowing in the second heat exchanger 210. Oil flowing in the first heat exchanger 110 may indirectly exchange heat with the second fluid through thermal conduction using the diaphragm between the first heat exchanger 110 and the second heat exchanger 210. If the temperature of oil in the first heat exchanger 110 is higher than the temperature of the second fluid in the second heat exchanger 210, heat of such oil may be transferred to the second fluid. If the temperature of oil in the first heat exchanger 110 is lower than the temperature of the second fluid in the second heat exchanger 210, such oil may absorb heat from the second fluid.

In the first flow path, a ratio of an area of the inner circumferential surface of the motor housing 40 surrounded by the second heat exchanger 210 to an area of the inner circumferential surface of the motor housing 40 surrounded by the first heat exchanger 110 based on a circumferential direction of the shaft 10 may be 1:0.3-0.7, for example.

As exemplarily shown in FIGS. 2 and 5, the circumferential direction of the shaft 10 may be defined as a direction in which the outer diameter of the shaft 10 is formed. With reference to FIGS. 9 and 10, the first heat exchanger 110 may have an arc shape, as seen from one open side of the motor housing 40. The first heat exchanger 110 may be provided to surround a left part of the inner circumferential surface of the motor housing 40 when the inner circumferential surface of the motor housing 40 is divided equally into left and right parts. The first heat exchanger 110 may be provided to surround at least a part of the second heat exchanger 210, based on the radial direction of the shaft 10.

The first heat exchanger 110 may be provided to surround at least a part of the inner circumferential surface of the motor housing 40, based on the radial direction of the shaft 10.

The first heat exchanger 110 may have a shape surrounding a half or more of the inner circumferential surface of the motor housing 40. The first heat exchanger 110 may be formed within a wall of the motor housing 40.

The first heat exchanger 110 may be provided to surround the right part of the inner circumferential surface of the motor housing 40. In the above-described first heat exchanger 110, a main flow of oil is formed in the upward direction along the first heat exchanger 110 and, thus, oil may be effectively pumped by the oil pump 80. Here, the main flow may be defined as an overall flow of a fluid based on a start point and an end point of a path, although, when the fluid flows along the path, flow directions in some sections are different. Further, in the first heat exchanger 110, oil may be effectively pumped by only one oil pump 80.

The inner surface of the first heat exchanger 110 may be connected to the outer surface of the second heat exchanger 210. That is, the first heat exchanger 110 and the second heat exchanger 210 may be divided by the diaphragm. Here, one side of the diaphragm may constitute one surface of the first heat exchanger 110 and the other side of the diaphragm may constitute one surface of the second heat exchanger 210. A wall forming the outer circumferential surface of the motor housing 40 may form one side surface of the first heat exchanger 110.

Figure 11:
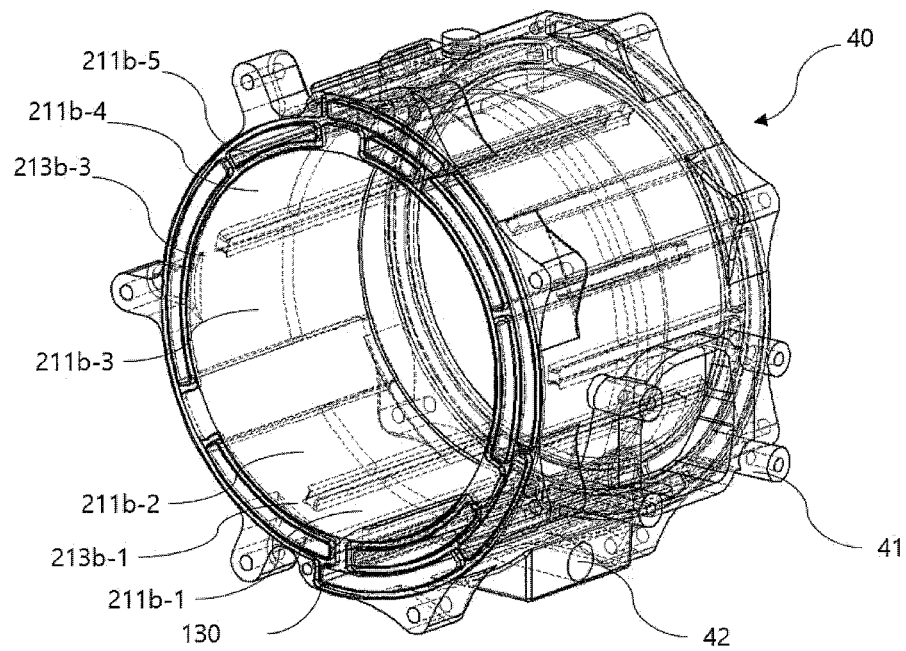
FIG. 11 is a transparent perspective view of a part of the motor housing of FIG. 6.
Figure 12:
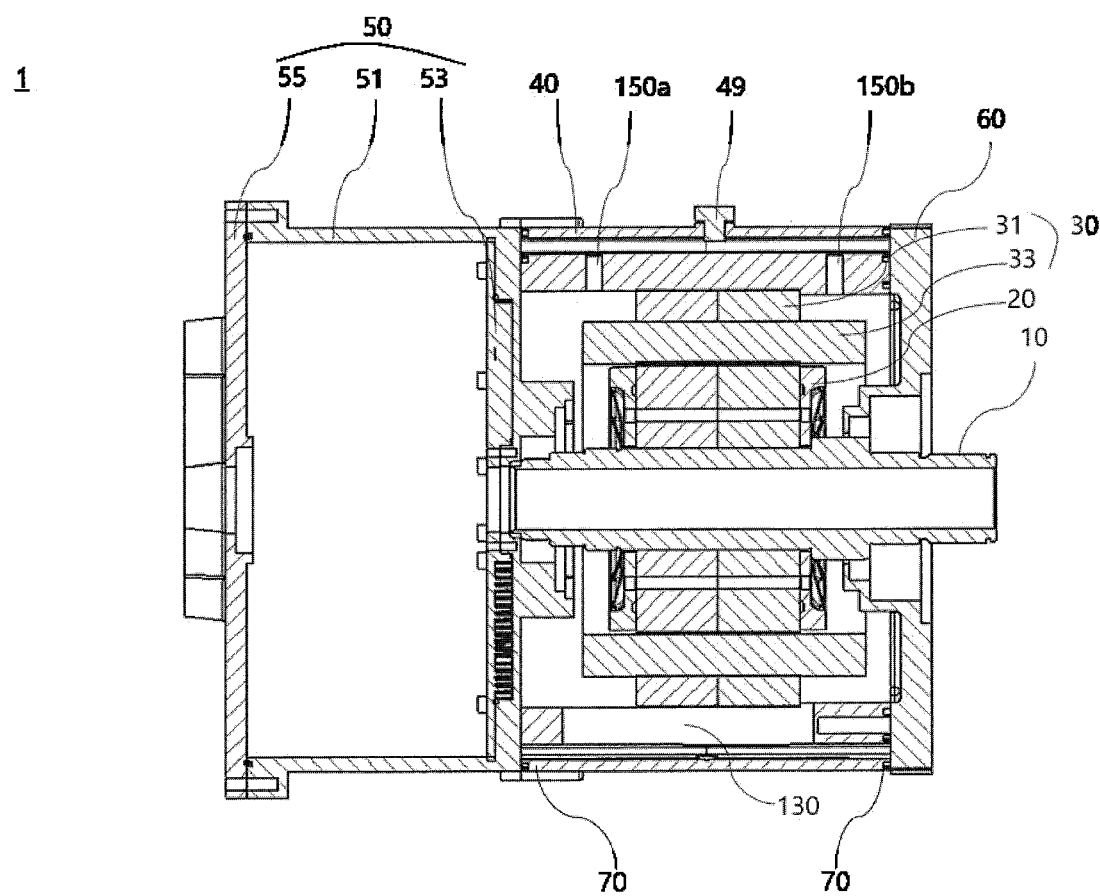
FIG. 12 is a cross-sectional view of FIG. 1, taken along line A-A'.

With reference to FIGS. 9 to 11, the first heat exchanger 110 may include a plurality of first heat exchange cells 111 arranged in a circumferential direction of the motor housing 40. As exemplarily shown in FIGS. 6 and 9, the circumferential direction of the motor housing 40 may be defined as a direction in which the outer diameter of the motor housing 40 is formed. The circumferential direction of the motor housing 40 may be defined as the same direction as the circumferential direction of the shaft 10.

The first heat exchange cells 111 may be arranged in the circumferential direction of the motor housing 40 while surrounding the inner circumferential surface of the motor housing 40. A heat exchange cell may be defined as a unit space in which a fluid may flow and exchange thermal energy with the outside of the heat exchange cell.

The heat exchange cell may be defined as a part of a space formed between the inner circumferential surface and the outer circumferential surface of the motor housing 40. The first heat exchange cells 111 may be divided from each other by diaphragms provided between the first heat exchange cells 111.

The diaphragms provided between the first heat exchange cells 111 may be formed between the inner circumferential surface and the outer circumferential surface of the motor housing 40. The diaphragms provided between the first heat exchange cells 111 may be walls extending from the inner surface of the first heat exchanger 110 to the outer surface of the first heat exchanger 110. The diaphragms provided between the first heat exchange cells 111 may be formed integrally with the motor housing 40. The first heat exchange cells 111 may be defined as having a length in an oil flow direction in the first heat exchange cells 111, i.e., in the forward and backward directions. The first heat exchange cells 111 may be defined as having a width and a height in directions perpendicular to the oil flow direction in the first heat exchange cells 111.

The first heat exchange cells 111 may be defined as having a width in the circumferential direction of the motor housing 40, a height in the radial direction of the shaft 10, and a distance in the forward and backward directions. Each of the first heat exchange cells 111 may have a shape which has a constant width and a constant height and extends from one end to the other end of the motor housing 40. Each of the first heat exchange cells 111 may have a shape provided with one end which is open forwards and the other end which is open backwards.

The width of each first heat exchange cell 111 may not be constant within a designated range. The width of each first heat exchange cell 111 may be varied within the designated range due to restrictions or constraints on processes, such as manufacturing processes. The width of a part of the first heat exchange cell 111 corresponding to the end of the motor housing 40 may be greater than the width of a part of the first heat exchange cell 111 corresponding to the center of the motor housing 40. The first heat exchange cells 111 may have different widths. The width of the first heat exchange cell 111 provided at the upper region of the motor housing 40 may be smaller than the width of the first heat exchange cell 111 provided at the lower region of the motor housing 40. According to the continuity equation regarding motion of an incompressible fluid, when a flow rate is constant, a flow velocity is in inverse proportion to the cross-sectional area of a path. Therefore, in order to compensate for lowering of the flow velocity of oil due to gravity and friction when oil flows in the first heat exchangers 111, the widths of the first heat exchange cells 111 may be decreased in the upward direction.

In another embodiment, the first heat exchange cells 111 may have the same width. The first heat exchange cells 111 may have the same height.

In another embodiment, the first heat exchange cells 111 may have different heights. In the first heat exchange cells 111 having the same width and different heights, if the cross-sectional areas of paths of the first heat exchange cells 111 are different, oil may more effectively flow in some embodiments.

The first heat exchange cells 111 may communicate with the oil pump 80 and thus receive flow pressure from the oil pump 80. One of the first heat exchange cells 111 may be provided with the intake path 42 and thus communicate with the inlet of the oil pump 80 through the intake path 42.

Another first heat exchange cell 111 adjacent to the first heat exchange cell 111 provided with the intake path 42 may be provided with the discharge path 43 and thus communicate with the outlet of the oil pump 80 through the discharge path 43.

In this embodiment, among the first heat exchange cells 111, the lowermost first heat exchange cell 111-1 may communicate with the intake path 42. The lowermost first heat exchange cell 111-1 may communicate with the inlet of the oil pump through the intake path 42 and, thus, oil discharged from the first heat exchange cell 111-1 may be introduced into the oil pump 80.

In this embodiment, among the first heat exchange cells 111, the lower first heat exchange cell 111-2, which is the second from the bottom, may communicate with the discharge path 43. The lower first heat exchange cell 111-2, which is the second from the bottom, may be adjacent to the lowermost first heat exchange cell 111-1.

The lower first heat exchange cell 111-2, which is the second from the bottom, may communicate with the outlet of the oil pump through the discharge path 43 and, thus, oil discharged from the oil pump 80 may be introduced into the lower first heat exchange cell 111-2. In the first flow path 100, an oil flow from the lowermost first heat exchange cell 111-1 to the lower first heat exchange cell 111-2, which is the second from the bottom, may be formed. The first flow path 100 may receive flow pressure, causing oil to flow along the first flow path 100, from the oil pump 80.

One of the first heat exchange cells 111 may be provided with the oil injection hole, through which oil from the outside of the motor housing 40 is introduced into the first flow path 100. The uppermost first oil cell 111-5 may be provided with a hole, through which the first heat exchange cells 111 communicate with the outside of the motor housing 40, i.e., the oil injection hole. The oil injection hole may be opened and closed by the oil lid 49. Thereby, oil may be injected into the first flow path 100 or oil in the first flow path 100 may be discharged to the outside. The diaphragms between the first heat exchange cells 111 may have the same thickness. The first heat exchange cells 111 may communicate with each other by first heat exchange connection paths 113.

With reference to FIGS. 9 to 11, the first heat exchanger 110 may include a plurality of first heat exchange connection paths 113, through which the first heat exchange cells 111 communicate with each other. The first heat exchange connection paths 113 may be disposed at both ends of the motor housing 40.

The first heat exchange connection paths 113 may be located close to the front or rear end of the motor housing 40. The first heat exchange connection paths 113 may be defined as having a length in an oil flow direction in the first heat exchange connection paths 113, i.e., in the circumferential direction of the motor housing 40. The first heat exchange connection paths 113 may be defined as having a width and a height in directions perpendicular to the oil flow direction. The first heat exchange connection paths 113 may be defined as having a length corresponding to the thickness of the diaphragms between the first heat exchange cells 111, a width corresponding to a distance between the diaphragms and the front or rear end of the motor housing 40, and a height corresponding to a distance from the inner surface to the outer surface of the first heat exchanger 110.

The first heat exchange connection paths 113 alternately connect designated ends (i.e. first ends) and the other ends (i.e. second ends) of the first heat exchange cells to each other, based on the length direction of the shaft 10 and, thus, the flow direction of the first fluid may be alternately changed between a third direction and a fourth direction. As exemplarily shown in FIGS. 1 and 4, the length direction of the shaft 10 may be defined as a direction extending so as to be perpendicular to the radial direction of the shaft 10.

With reference to FIG. 9 to 11, the first heat exchange connection path 113-1 may connect the rear end of the first heat exchange cell 111-2, which is the second from the bottom, and the rear end of the first heat exchange cell 111-3, which is the third from the bottom, to each other.

The first heat exchange connection path 113-2 may connect the front end of the first heat exchange cell 111-3, which is the third from the bottom, and the front end of the first heat exchange cell 111-4, which is the fourth from the bottom, to each other. The first heat exchange connection path 113-3 may connect the rear end of the first heat exchange cell 111-4, which is the fourth from the bottom, and the rear end of the uppermost first heat exchange cell 111-5 to each other. In this embodiment, the third direction may be defined as a direction from the front to the rear and the fourth direction may be defined as a direction from the rear to the front, based on a length direction along a length of the shaft 10. In the above-described first heat exchanger 110, the oil flow direction is changed alternately between the third direction and the fourth direction and, thus, heat exchange between the first heat exchanger 110 and the second heat exchanger 210 may be effectively carried out.

The first heat exchange connection paths 113 may have a narrower width than the width of the first heat exchange cells 111. The first heat exchanger 110 may be provided such that the number of changes in the flow direction of the first fluid in the first heat exchanger 110 varies from the number of changes in the flow direction of the second fluid in a part of the second heat exchanger 210, which is surrounded or covered by the first heat exchanger 110, based on the length direction of the shaft 10.

For example, the first heat exchanger 110 may be provided such that the number of changes in the flow direction of the second fluid in a part of the second heat exchanger 210 surrounded or covered by the first heat exchanger 110 is greater than the number of changes in the oil flow direction in the first heat exchanger 110 in the forward and backward directions. The first heat exchanger 110 may be provided such that the number of second heat exchange connection paths 213 of a part of the second heat exchanger 210 surrounded by the first heat exchanger 110 is greater than the number of the first heat exchange connection paths 112 of the first heat exchanger 110.

The first heat exchanger 110 may be provided such that the number of changes in the flow direction of the second fluid in a part of the second heat exchanger 210 surrounded by the first heat exchanger 110 is smaller than the number of changes in the oil flow direction in the first heat exchanger 110 in the forward and backward directions. The first heat exchanger 110 may be provided such that the number of the second heat exchange connection paths 213, of a part of the second heat exchanger 210 surrounded by the first heat exchanger 110, is smaller than the number of the first heat exchange connection paths 112 of the first heat exchanger 110. If the vertical cross-sectional area of the motor housing 40 is constant and a flow rate is constant, when the number of heat exchange connection paths is increased, a cross-sectional area of a path in which a fluid flows is decreased and a flow velocity is increased.

Since the number of changes in the fluid flow direction in the first heat exchanger 110 and the number of changes in the fluid flow direction in the second heat exchanger 210 are different, based on characteristics of fluids flowing therein, heat exchange between the first heat exchanger 110 and the second heat exchanger 210 may be effectively performed. In accordance with another embodiment, the first heat exchanger 210 may be provided such that at least some of the first heat exchange cells 111 overlap second heat exchange cells 211, based on the radial direction of the shaft 10. In the first heat exchanger 110, the first heat exchange cells 111 may be formed so as to correspond to the second heat exchange cells 211. The inner surfaces of the first heat exchange cells 111 face the outer surfaces of the second heat exchange cells 112 with the diaphragm disposed therebetween.

The first heat exchanger 110 may be provided such that the flow direction in the first heat exchange cell 111 is the same as the flow direction in the second heat exchange cell 211 of the second heat exchanger 210, facing the first heat exchange cell 111. Otherwise, the first heat exchanger 110 may be provided such that the flow direction in the first heat exchange cell 111 is opposite to the flow direction in the second heat exchange cell 211 of the second heat exchanger 210, facing the first heat exchange cell 111.

Therefore, a broad heat exchange area between the first heat exchanger 110 and the second heat exchanger 210 is provided. As a result, heat exchange between the first heat exchanger 110 and the second heat exchanger 210 may be effectively performed.

Figure 8:
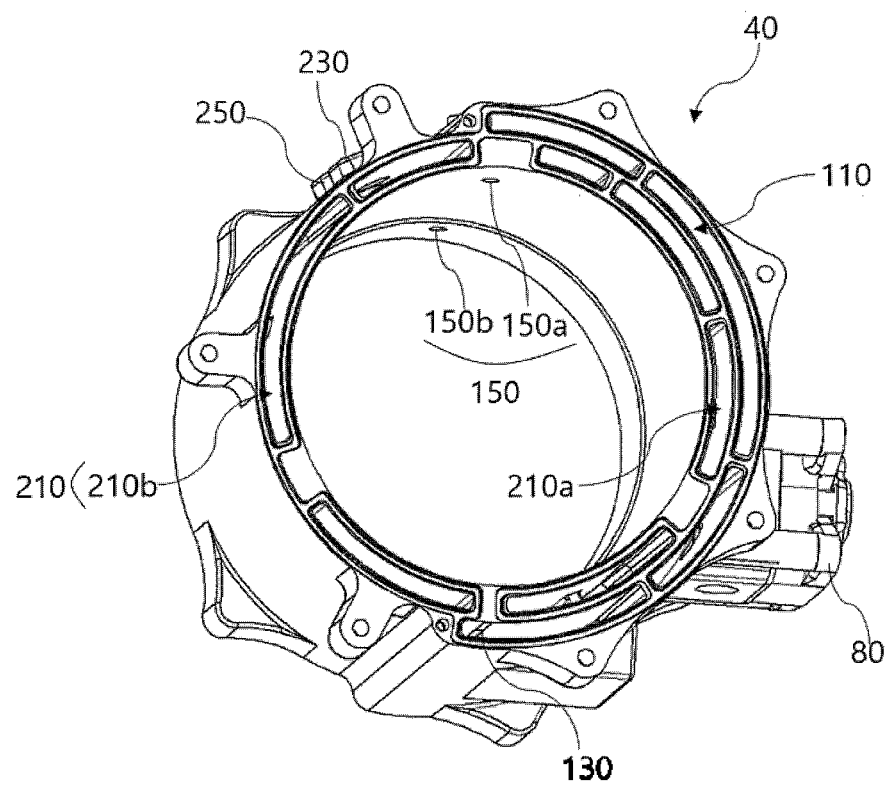
FIG. 8 is a perspective view of the motor housing of FIG. 1, as seen from the other side.

With reference to FIGS. 6, 8 and 11, the first flow path 100 may include a first inlet 130, through which the first heat exchanger 110 and the inner space of the motor housing 40 communicate with each other and the first fluid is introduced into the first flow path 100 from the inner space of the motor housing 40. One end of the first inlet 130 may communicate with the inner space of the motor housing 40 and the other end of the first inlet 130 may communicate with one of the first heat exchange cells 111.

In this embodiment, one end of the first inlet 130 may communicate with the inner space of the motor housing 40 and the other end of the first inlet 130 may communicate with the lowermost first heat exchange cell 111-1. The first inlet 130 may be disposed between second heat exchange cells 211a-7 and 211b-1. The first inlet 130 may be provided as a through hole passing through a diaphragm between the second heat exchange cells 211a-7 and 211b-1. In this embodiment, the first inlet 130 may be provided as a slot, which is disposed between the second heat exchange cells 211a-7 and 211b-1 and extends in the length direction of the shaft 10. The first inlet 130 may be provided as a slot, which extends in forward and backward directions on the inner circumferential surface of the motor housing 40. The first inlet 130 may be provided as a slot provided with a front end, which is equal to the front end of the coil 33 or extends farther forward than the front end of the coil 33. The first inlet 130 may be provided as a slot provided with a rear end, which is equal to the rear end of the coil 33 or extends farther backward than the front end of the coil 33. The first inlet 130 may extend in a direction vertical to the inner circumferential surface of the motor housing 40. The first inlet 130 may be disposed at the lowermost portion of the inner circumferential surface of the motor housing 40.

The first inlet 130 may allow oil to be introduced into the first flow path 100 without interference with the second flow path 200 and to be effectively introduced into the first flow path 100 from the inner space of the motor housing 40 by weight of the oil.

Further, the first inlet 130 may allow oil in the inner space of the motor housing 40 to be uniformly inhaled to the oil pump 80. A plurality of first inlets 130 may be provided.

With reference to FIG. 8, the first flow path 100 may include first outlets 150, through which the first heat exchanger 110 and the inner space of the motor housing 40 communicate with each other and the first fluid is discharged to the inner space of the motor housing 40 from the first flow path 100. One end of each of the first outlets 150 may communicate with the inner space of the motor housing 40 and the other end of each of the first outlets 150 may communicate with one of the first heat exchange cells 111. In an embodiment, one end of each of the first outlets 150 may communicate with the inner space of the motor housing 40 and the other end of each of the first outlets 150 may communicate with the uppermost first heat exchange cell 111-5. The first outlets 150 may be disposed between second heat exchange cells 211*a*-1 and 211*b*-5. The first outlets 150 may be provided as holes passing through a diaphragm between the second heat exchange cells 211*a*-1 and 211*b*-5. The first outlets 150 may be provided as holes formed on the inner circumferential surface of the motor housing 40 and allowing the first heat exchanger 110 and the inner space of the motor housing 40 to communicate with each other.

The first outlets 150 may pass through a diaphragm between an inlet and outlet cell 211*b*-5 and a second heat exchange cell 211*a*-1 of a second heat exchanger front part of the second heat exchanger 210. The first outlets 150 may communicate with the uppermost first heat exchange cell 111-5 out of the first heat exchange cells 111. The first outlets 150 may be holes extending in a direction vertical to the inner circumferential surface of the motor housing 40. The first outlets 150 may include a plurality of first outlets 150*a* and 150*b* which are spaced apart from each other in the forward and backward directions by a designated distance.

The first outlets 150 may be disposed above the coils 33 based on the direction of gravity, so as to spray oil, discharged to the inner space of the motor housing 40 through the first inlets 150, directly to the coils 33. The first outlets 150*a* and 150*b* are respectively disposed above the coils 33 exposed forward and backward from the stator cores 31 and may thus effectively cool the coils 33. The first outlets 150 may allow oil to be discharged to the inner space of the motor housing 140 without interference with the second flow path 200 and to be effectively discharged to the inner space of the motor housing 40 by flow pressure.

The motor 1 may further include an oil distributer in the motor housing 40 and the oil distributer may more widely inject oil, discharged through the first outlets 150, to the inner space of the motor housing 40. The second flow path 200 may be disposed at the outside of the stator 30 based on the radial direction of the shaft 10.

The second flow path 200 may be disposed between the first flow path 100 and the stator 30 based on the radial direction of the shaft 10. The second flow path 200 may be formed between the inner circumferential surface and the outer circumferential surface of the motor housing 40. The second flow path 200 may be formed integrally with the motor housing 40. The second flow path 200 may be formed in the motor housing 40 by die casting. The second flow path 200 may be formed by combining the inverter housing 51 and the rear cover 60 with the motor housing 40.

With reference to FIGS. 6, 9 and 10, a part of a wall of the second flow path 200 is formed by opening both sides of the motor housing 40, and the remaining part of the wall of the first flow path 200 may be formed by combining the inverter housing 51 and the rear cover 60 with the motor housing 40. A second fluid may flow within the second flow path 200. The second fluid may absorb heat of the stator 30 transferred through the path wall. The second fluid may be at least one of various fluids, such as at least one of oil, air, etc. The second fluid may be circulated along the second flow path 200.

The second fluid may be circulated along the second flow path 200 and exchange thermal energy with the second flow path 200 and members or components adjacent to the second flow path 200, which exchanges heat with the second flow path 200. The second fluid may absorb heat transferred from the inner circumferential surface of the motor housing 40 forming one side wall of the second heat exchanger 210. The second fluid may absorb heat of the stator cores 31 being in surface contact with the inner circumferential surface of the motor housing 40. The second fluid may absorb heat transferred through the diaphragm between the second flow path 200 and the first flow path 100. The second fluid may absorb heat in the first flow path 100.

Since the second fluid does not directly contact devices disposed in the motor housing 40, such as the stator 30, the rotor 20, etc., the second fluid may employ a material which effectively absorbs heat regardless of electrical interference.

Hereinafter, water will be exemplarily described as the second fluid, but the present disclosure is not limited to water. The water used may include pure water, water with additives, water with electrolytes, etc. The second flow path 200 may communicate with a cooling water circulation system outside of the motor housing 40 so that water is circulated through the cooling water circulation system and the second flow path 200 in the motor housing 40. The cooling water circulation system may include a cooling water pump, a radiator serving as a heat exchanger, etc., and provided so as to cool an engine or other members or components of a vehicle.

Water may flow along the second flow path 200 by flow pressure received from the cooling water circulation system.

With reference to FIGS. 6, 8, 9 and 10, the second flow path 200 may include the second heat exchanger 210 formed between an inner circumferential surface and an outer circumferential surface of the motor housing 40, so as to exchange heat with the stator 30 or other components. The second heat exchanger 210 may be disposed at a more inside region than the first heat exchanger 110, based on or relative to the structural center of the motor housing 40. Water flows through the second heat exchanger 210 and may thus absorb heat of the stator 30 and cool the stator 30.

The second heat exchanger 210 may share an outer path wall thereof with the first heat exchanger 210, relative to the structural center of the motor housing 40. That is, the outer path wall of the second heat exchanger 210 may be the inner path wall of the first heat exchanger 110. One side of the diaphragm between the first heat exchanger 110 and the second heat exchanger 210 may be one surface of the path of the first heat exchanger 110. The other side of the diaphragm may be one surface of the path of the second heat exchanger 210.

Water flowing through the second heat exchanger 210 may exchange heat with oil flowing through the first heat exchanger 110. Water flowing through the second heat exchanger 210 may indirectly exchange heat with oil through thermal conduction using the diaphragm between the first heat exchanger 110 and the second heat exchanger 210. If the temperature of water in the second heat exchanger 210 is higher than the temperature of oil in the first heat exchanger 210, heat of such water may be transferred to oil. If the temperature of water in the second heat exchanger 210 is lower than the temperature of oil in the first heat exchanger 110, such water may absorb heat from the oil. A ratio of the area of the inner circumferential surface of the motor housing 40 surrounded by the second heat exchanger 210 to the area of the inner circumferential surface of the motor housing 40 surrounded by the first heat exchanger 110 based on the circumferential direction of the shaft 10 may be 1:0.3-0.7, for example.

With reference to FIG. 5, the second heat exchanger 210 may be provided to have a donut shape, as seen from one open side of the motor housing 40. The second heat exchanger 210 may be provided to surround the inner circumferential surface of the motor housing 40. The second heat exchanger 210 may be formed within a housing wall of the motor housing 40. The second heat exchanger 210 may be formed to have a shape surrounding 90% or more of an inner circumferential surface of the motor housing 40.

One end of the second heat exchanger 210 may communicate with an inverter heat exchanger 52. The other end of the second heat exchanger 210 may communicate with a second outlet 250. The second heat exchanger 210 may be divided into a second heat exchanger front part and a second heat exchanger rear part described below. One end of the second heat exchanger 210 may communicate with the inverter heat exchanger 52. The other end of the second heat exchanger 210 may communicate with a second heat exchanger rear part 210b.

In the second flow path 200, water may be first introduced into the inverter heat exchanger 52 and thus cool an inverter, and water discharged from the inverter heat exchanger 52 may be introduced into the second heat exchanger 210. Water first cools the inverter having a relatively low temperature and then cools oil having a relatively high temperature and, thus, water serving as a cooling fluid, may effectively absorb target objects to be cooled. An inverter heat exchanger 52 will be described later.

With reference to FIGS. 9 to 11, the second heat exchanger 210 may include a plurality of second heat exchange cells 211 arranged in the circumferential direction of the motor housing 40. The second heat exchange cells 211 may be arranged in the circumferential direction of the motor housing 40 while surrounding the inner circumferential surface of the motor housing 40. The second heat exchange cells 211 may be divided from each other by diaphragms provided between the second heat exchange cells 211. The diaphragms provided between the second heat exchange cells 211 may be formed between the inner circumferential surface and the outer circumferential surface of the motor housing 40. The diaphragms provided between the second heat exchange cells 211 may be walls extending from the inner surface of the second heat exchanger 210 to the outer surface of the second heat exchanger 120. The diaphragms provided between the second heat exchange cells 211 may be formed integrally with the motor housing 40. The second heat exchange cells 211 may be defined as having a length in a water flow direction in the second heat exchange cells 211, i.e., in the forward and backward directions. The second heat exchange cells 211 may be defined as having a width and a height in directions perpendicular to the water flow direction in the second heat exchange cells 211.

The second heat exchange cells 211 may be defined as having a width in the circumferential direction of the motor housing 40, a height in the radial direction of the shaft 10, and a distance in the forward and backward directions. Each of the second heat exchange cells 211 may have a constant width and a constant height and extend from one end to the other end of the motor housing 40. Each of the second heat exchange cells 211 may have a shape provided with one end which is open to one side of the motor housing 40 and the other end which is open to the other side of the motor housing 40. Each of the second heat exchange cells 211 may have a shape provided with one end which is open in the forward direction of the motor housing 40 and the other end which is open in the backward direction of the motor housing 40.

The width of each second heat exchange cell 211 may not be uniform within a designated error range. The width of each second heat exchange cell 211 may be varied within the designated error range due to restrictions or limitations on processes. The width of a part of the second heat exchange cell 211 corresponding to the front or rear end of the motor housing 40 may be greater than the width of a part of the second heat exchange cell 211 corresponding to the center of the motor housing 40.

The second heat exchange cells 211 may have different widths. The width of the second heat exchange cell 211 located at the upper region of the motor housing 40 may be smaller than the width of the second heat exchange cell 211 located at the lower region of the motor housing 40.

According to the continuity equation regarding motion of an incompressible fluid, when a flow rate is constant, a flow velocity is in inverse proportion to the cross-sectional area of a path. Therefore, in order to compensate for lowering of the flow velocity of water due to gravity and friction when water flows in the second heat exchangers 211, the widths of the second heat exchange cells 211 are decreased in the upward direction.

In another embodiment, the second heat exchange cells 211 may have the same width. The second heat exchange cells 211 may have the same height.

In another embodiment, the second heat exchange cells 211 may have different heights. In the second heat exchange cells 211 having the same width and different heights, if the cross-sectional areas of paths of the second heat exchange cells 211 are different, water may effectively flow. The second heat exchange cells 211 may receive flow pressure from the cooling water circulation system and, thus, water may be circulated. One of the second heat exchange cells 211 may be provided with a second inlet 230 and, thus, the second heat exchange cells 211 may communicate with the cooling water circulation system through the second inlet 230 and water may be introduced into the second heat exchange cells 211 from the cooling water circulation system. One of the second heat exchange cells 211 may be provided with a second outlet 250 and, thus, the second heat exchange cells 211 may communicate with the cooling water circulation system through the second outlet 250 and water may be discharged from the second heat exchange cells 211 to the cooling water circulation system. In an embodiment, among the second heat exchange cells 211, the second heat exchange cell 211b-5 disposed at a right uppermost region (hereinafter, referred to as an "inlet and outlet cell 211b-5") may directly communicate with the second inlet 230.

The inlet and outlet cell 211b-5 may communicate with the cooling water circulation system through the second inlet 230 and water discharged from the cooling water circulation system may be introduced into the inlet and outlet cell 211b-5. The second inlet 230 and the second outlet 250 may be provided at different second heat exchange cells 211. The inlet and outlet cell 211b-5 will be described below.

The diaphragms provided between the second heat exchange cells 211 may have different thicknesses. With reference to FIGS. 9 and 10, the diaphragm provided between the second heat exchange cell 211a-6, which is the second from the bottom, and the second heat exchange cell 211a-7, which is the third from the bottom, may have a greater thickness than that of the diaphragms provided between other second heat exchange cells 211. The diaphragm provided between the second heat exchange cell 211*b*-2, which is the second from the bottom, and the second heat exchange cell 211*b*-3, which is the third from the bottom, may have a greater thickness than that of the diaphragms provided between other second heat exchange cells 211.

The diaphragms provided between the second heat exchange cells 211 which are the second from the bottom, and the second heat exchange cells which are the third from the bottom, may have a greater thickness than that of the diaphragms provided between other second heat exchange cells 211, so that the second heat exchange cells 211 are arranged to be bilaterally symmetrical.

The motor housing 40 having the above described configuration may be advantageous in that structural rigidity is enhanced and heat exchange in second heat exchange connection paths 213*a*-5 and 213*b*-2, at points where the diaphragms have a large thickness, is effectively carried out. Further, the diaphragm disposed at the uppermost part of the motor housing 40 and a pair of the diaphragms having a large thickness have bilaterally symmetry. Thus, robustness of the motor housing 40 to stress and strain may be improved. The diaphragms provided between the second heat exchange cells 211 may have the same thickness. The second heat exchange cells 211 may communicate with each other by second heat exchange connection paths 213.

With reference to FIGS. 9 to 11, the second heat exchanger 210 may include a plurality of second heat exchange connection paths 213, through which the first heat exchange cells 111 communicate with each other. The second heat exchange connection paths 213 may be disposed at both ends of the motor housing 40. The second heat exchange connection paths 213 may be located close to the front or rear end of the motor housing 40. The second heat exchange connection paths 213 may be defined as having a length formed in a water flow direction in the second heat exchange connection paths 213, i.e., in the circumferential direction of the motor housing 40. The second heat exchange connection paths 213 may be defined as having a width and a height formed in directions perpendicular to the water flow direction, i.e., in the radial direction of the shaft 10 and in the forward and backward directions.

The second heat exchange connection paths 213 may be defined as having a length corresponding to the thickness of the diaphragms between the second heat exchange cells 211, a width corresponding to a distance between the diaphragms and the front or rear end of the motor housing 40, and a height corresponding to a distance from the inner surface to the outer surface of the second heat exchanger 210.

The second heat exchange connection paths 213 alternately connect designated ends (i.e. first ends) and the other ends (i.e. second ends) of the second heat exchange cells 211 to each other, based on the length direction of the shaft 10 and, thus, the flow direction of the second fluid in the second heat exchanger 210 may be alternately changed between a first direction and a second direction. The second heat exchanger 210 may include a second heat exchanger front part 210*a* surrounded by the first heat exchanger 110 and a second heat exchanger rear part 210*b* that is not surrounded by the first heat exchanger 110.

With reference to FIGS. 9 to 11, the second heat exchange connection path 213*a*-1 may connect the rear end of the uppermost second heat exchange cell 211*a*-1 of the second heat exchanger front part 210*a* and the rear end of the second heat exchange cell 211*a*-2 of the second heat exchanger front part 210*a*. Which is the second from the top, to each other. The second heat exchange connection path 213*a*-2 may connect the front end of the second heat exchange cell 211*a*-2 of the second heat exchanger front part 210*a*, which is the second from the top, and the front end of the second heat exchange cell 211*a*-3 of the second heat exchanger front part 210*a*, which is the third from the top, to each other. The second heat exchange connection path 213*a*-3 may connect the rear end of the second heat exchange cell 211*a*-3 of the second heat exchanger front part 210*a*, which is the third from the top, and the rear end of the second heat exchange cell 211*a*-4 of the second heat exchanger front part 210*a*, which is the fourth from the top, to each other. The second heat exchange connection path 213*a*-4 may connect the front end of the second heat exchange cell 211*a*-4 of the second heat exchanger front part 210*a*, which is the fourth from the top, and the front end of the second heat exchange cell 211*a*-5 of the second heat exchanger front part 210*a*, which is the fifth from the top, to each other. The second heat exchange connection path 213*a*-5 may connect the rear end of the second heat exchange cell 211*a*-5 of the second heat exchanger front part 210*a*, which is the fifth from the top, and the rear end of the second heat exchange cell 211*a*-6 of the second heat exchanger front part 210*a*, which is the sixth from the top, to each other. The second heat exchange connection path 213*a*-6 may connect the front end of the second heat exchange cell 211*a*-6 of the second heat exchanger front part 210*a*, which is the sixth from the top, and the front end of the lowermost second heat exchange cell 211*a*-7 of the second heat exchanger front part 210*a* to each other. The second heat exchange connection path 213*a*-7 may connect the rear end of the lowermost second heat exchange cell 211*a*-7 of the second heat exchanger front part 210*a* and the rear end of the lowermost second heat exchange cell 211*b*-1 of the second heat exchanger rear part 210*b* to each other. The second heat exchange connection path 213*b*-1 may connect the front end of the lowermost second heat exchange cell 211*b*-1 of the second heat exchanger rear part 210*b* and the front end of the second heat exchange cell 211*b*-2 of the second heat exchanger rear part 210*b*, which is the second from the bottom, to each other. The second heat exchange connection path 213*b*-2 may connect the rear end of the second heat exchange cell 211*b*-2 of the second heat exchanger rear part 210*b*, which is the second from the bottom, and the rear end of the second heat exchange cell 211*b*-3 of the second heat exchanger rear part 210*b*, which is the third from the bottom, to each other. The second heat exchange connection path 213*b*-3 may connect the front end of the second heat exchange cell 211*b*-3 of the second heat exchanger rear part 210*b*, which is the third from the bottom, and the front end of the second heat exchange cell 211*b*-4 of the second heat exchanger rear part 210*b*, which is the fourth from the bottom, to each other. The second heat exchange connection path 213*b*-4 may connect the rear end of the second heat exchange cell 211*b*-4 of the second heat exchanger rear part 210*b*, which is the fourth from the bottom, and the rear end of the inlet and outlet cell 211*b*-5 to each other.

In this embodiment, the first direction may be defined as a direction from the front to the rear and the second direction may be defined as a direction from the rear to the front, based on the length direction of the shaft 10.

In the above-described second heat exchanger 210, the water flow direction is changed alternately between the first direction and the second direction and, thus, heat exchange between the first heat exchanger 110 and the second heat exchanger 210 may be effectively carried out. The second heat exchange connection paths 213 may have a narrower width than the width of the second heat exchange cells 211. The second heat exchanger 210 may be provided such that the number of changes in the flow direction of the first fluid in the first heat exchanger 110 based on the length direction of the shaft 10 differs from the number of changes in the flow direction of the second fluid in the part of the second heat exchanger 210 surrounded by the first heat exchanger 110.

For example, the first heat exchanger 110 may be provided such that the number of changes in the flow direction of the second fluid in the second heat exchanger front part 210a of the second heat exchanger 210 from the first direction to the second direction and from the second direction to the first direction is greater than the number of changes in the oil flow direction in the first heat exchanger 110 from the third direction to the fourth direction and from the fourth direction to the third direction.

The second heat exchanger front part 210a of the second heat exchanger 210 may be provided such that the number of the second heat exchange connection paths 213 of the second heat exchanger front part 210a is greater than the number of the first heat exchange connection paths 112 of the first heat exchanger 110. The second heat exchanger front part 210a of the second heat exchanger 210 may be provided such that the number of changes in the water flow direction of the second heat exchanger front part 210a is smaller than the number of changes in the oil flow direction in the first heat exchanger 110.

The second heat exchanger front part 210a may be provided such that the number of the second heat exchange connection paths 213 of the second heat exchanger front part 210a is smaller than the number of the first heat exchange connection paths 112 of the first heat exchanger 110.

Oil or other fluid flowing in the first flow path 100 and water or other fluid flowing in the second flow path 200 may be fluids having different viscosities and may thus have different dynamic characteristics. In general, a decrement of the flow velocity of a fluid having relatively high viscosity due to friction with a path wall may be greater than a decrement of the flow velocity of a fluid having relatively low viscosity due to friction with the path wall. If a cross-sectional area of a path between the inner circumferential surface and the outer circumferential surface of the motor housing 40 is constant, when the number of heat exchange cells is increased, the number of diaphragms between the heat exchange cells may be increased. Thus, the cross-sectional area of the path in which a fluid actually flows may be decreased. Therefore, since, when a flow rate is constant, a flow velocity is in inverse proportion to the cross-sectional area of a path, the flow velocity may be increased as much as the decrease in the cross-sectional area of the path.

As described above, since the fluids in the first heat exchanger 110 and the second heat exchanger 210 have different flow velocities in consideration of the above-described fluid characteristics, heat exchange between oil, for example, flowing in the first heat exchanger 110 and water, for example, flowing in the second heat exchanger 210 may be effectively performed. The second heat exchanger 210 may be provided such that at least some of the first heat exchange cells 111 overlap the second heat exchange cells 211 based on the radial direction of the shaft 10. The second heat exchanger 210 may include the second heat exchanger front part 210a overlapping the first heat exchanger 110 and the second heat exchanger rear part 210b not overlapping the first heat exchanger 110, based on the radial direction of the shaft 10.

In this embodiment, the second heat exchanger front part 210a may include a plurality of second heat exchange cells 211a-1, 211a-2, 211a-3, 211a-4, 211a-5, 211a-6 and 211a-7, and a plurality of second heat exchange connection paths 213a-1, 213a-2, 213a-3, 231a-4, 213a-5, 213a-6 and 213a-7. In this embodiment, the second heat exchanger rear part 210b of the second heat exchanger 210 may include a plurality of second heat exchange cells 211b-1, 211b-2, 211b-3, 211b-4 and 211b-5, and a plurality of second heat exchange connection paths 213b-1, 213b-2, 213b-3 and 231b-4. In the second heat exchanger 210, the second fluid may be introduced into the second heat exchanger front part 210a, pass through the second heat exchanger rear part 210b and then be discharged to the outside of the motor housing 40.

With reference to FIG. 5 and FIG. 8, for example, water may be introduced into the second heat exchanger front part 210a located at the left part of the second heat exchanger 210, exchange heat with oil in the first heat exchanger 110 and then be discharged to the second heat exchanger rear part 210b. Water passed through the second heat exchanger rear part 210b of the second heat exchanger 210 may be discharged to the outside of the motor housing 40. Water introduced into the second heat exchanger 210 may first flow in the second heat exchanger front part 210a and absorb heat from the stator 30 and oil in the first heat exchanger 110. Water may flow in the second heat exchanger rear part 210b and absorb heat from the stator 30.

The second heat exchanger 210 having the above-described configuration may effectively cool oil flowing in the first heat exchanger 110. The second heat exchanger 210 may be configured such that water introduced into the second heat exchanger 210 first flows in the second heat exchanger rear part 210b (of the second heat exchanger 210) and then flows in the second heat exchanger front part 210a. In the second heat exchanger front part 210a, the second fluid introduced into the second heat exchange cell 211a-1 adjacent to the first outlets 150 may pass through the second heat exchange cell 211a-7 (adjacent to the first inlet 130) and then be discharged to the second heat exchanger rear part 210b.

With reference to FIGS. 6 to 11, the second heat exchanger front part 210a may be provided such that water may be introduced into the uppermost second heat exchange cell 211a-1 adjacent to the first outlets 150. The introduced water flows along a path in the second heat exchanger front part 210a. Water passed through the lowermost second heat exchange cell 211a-7 (adjacent to the first inlet 130) may be introduced into the lowermost second heat exchange cell 211b-1 of the second heat exchanger rear part 210b.

Water introduced into the second heat exchanger front part 210a having the above-described configuration may first cool oil discharged to the inner space of the motor housing 40, then cool oil flowing along the first heat change unit 110, and then cool oil introduced from the inner space of the motor housing 40 into the first heat exchanger 110.

Oil discharged to the inner space of the motor housing 40 and thus absorbing heat from the stator 30, the rotor 20, etc. is introduced into the first inlet 130 and flows along the first heat exchanger 110. Thus, the temperature of such oil may be gradually lowered.

If other conditions are equal, thermal conduction may be in direct proportion to a temperature difference between objects. Therefore, as the temperature difference between objects is increased, thermal conduction may increase. The above-described second heat exchanger 210 may be configured such that water first exchanges heat with oil having a relatively low temperature around the first outlets 150 and then exchanges heat with oil having a relatively high temperature around the first inlet 130. Thus, a temperature difference between oil and water is maintained at a designated level or above. As a result, heat exchange between the first heat exchanger 110 and the second heat exchanger 210 may be more effectively performed. The second heat exchanger front part 210a may be provided such that the width of the second heat exchange cell 211 adjacent to the first outlets 150 is smaller than the width of the second heat exchange cell 211 adjacent to the first inlet 130, based on the circumferential direction of the motor housing 40. With reference to FIGS. 9 to 11, the width of the uppermost second heat exchange cell 211a-1 of the second heat exchanger front part 210a adjacent to the first outlets 150 may be smaller than the width of the lowermost second heat exchange cell 211a-7 of the second heat exchanger front part 210a adjacent to the first inlet 130. The second heat exchanger front part 210a may be provided such that the widths of the second heat exchange cells 211 are increased in a downward direction. With regard to a relationship between cross-sectional area of a path and flow velocity, if a flow rate of a fluid is constant, the flow velocity of the fluid may be inversely proportion to the cross-sectional area of a path. With regard to a relationship between flow velocity and heat transfer coefficient, the heat transfer coefficient may be increased as the flow velocity is increased under the same density conditions.

The above-described second heat exchanger 210 may effectively cool oil around the first outlets 150 and, thus, oil discharged to the inner space of the motor housing 40 may effectively cool the stator 40, the rotor 20, etc. One end of the second heat exchanger rear part 210b may communicate with the second heat exchanger front part 210a. The other end of the second heat exchanger rear part 210b may communicate with the second outlet 250. The second heat exchanger rear part 210b may communicate with the second heat exchanger front part 210b through the second heat exchange connection path 213a-7. The rear end of the second heat exchange cell 211b-1 of the second heat exchanger rear part 210b adjacent to the first inlet 130 may be connected to the rear end of the second heat exchange cell 211a-7 of the second heat exchanger front part 210a adjacent to the first inlet 130 by the second heat exchange connection path 213a-7.

The second heat exchange cell 211b-5 of the second heat exchanger rear part 210b adjacent to the second heat exchanger front part 210a (hereinafter, referred to as the inlet and outlet cell 211b-5) may be divided into a front part and a rear part by a diaphragm provided at the center of the inlet and outlet cell 211b-5. The inlet and outlet cell 211b-5 may be divided into the front part and the rear part by the diaphragm provided at the center of the inlet and outlet cell 211b-5 and formed integrally with the motor housing 40. The inlet and outlet cell 211b-5 may be the uppermost second heat exchange cell 211b-5 of the second heat exchanger rear part 210b.

The front part of the inlet and outlet cell 211b-5 may communicate with the second inlet 230, through which the second fluid is introduced into the second heat exchanger 210 from the outside of the motor housing 40. The rear part of the inlet and outlet cell 211b-5 may communicate with the second outlet 250, through which the second fluid is discharged to the outside of the motor housing 40 from the second heat exchanger 210. The second fluid may pass through the front part of the inlet and outlet cell 211b-5 and then be introduced into the second heat exchanger front part 210a of the second heat exchanger 210. The second inlet 230 and the second outlet 250 will be described in detail below.

One side of the front part of the inlet and outlet cell 211b-5 facing the inverter housing 51 may be open and thus communicate with the inside of the inverter housing 51. The second fluid introduced into the front part of the inlet and outlet cell 211b-5 may be introduced into the second heat exchanger front part 210a after passing through a path in the inverter housing 51.

The inverter housing 51 may be provided with an inverter housing inflow hole 51-4 communicating with the front part of the inlet and outlet cell 211b-5. The inverter housing 51 may be provided with an inverter housing outflow hole 51-5 communicating with the second heat exchange cells 211 of the second heat exchanger front part 210a. Water introduced into the motor housing 40 from outside of the motor housing 40 may first flow into the inverter housing 51 and thus cool the inverter, and water discharged from the inverter housing 51 may flow into the second heat exchanger front part 210a and thus cool the stator 30 and oil.

The above-described heat exchanger 210 first cools the inverter housing 51 having a relatively low temperature and then cools oil having a relatively high temperature and may thus maintain a temperature difference between water serving as a refrigerant and a target object to be heat-exchanged or cooled to a designated temperature. Thereby heat exchange may be more effectively performed. The widths of the second heat exchange cells 211 (of the second heat exchanger front part 210a of the second heat exchanger 210) may be smaller than the widths of the second heat exchange cells 211 of the second heat exchanger rear part 210b, based on the circumferential direction of the motor housing 40.

Figure 4:
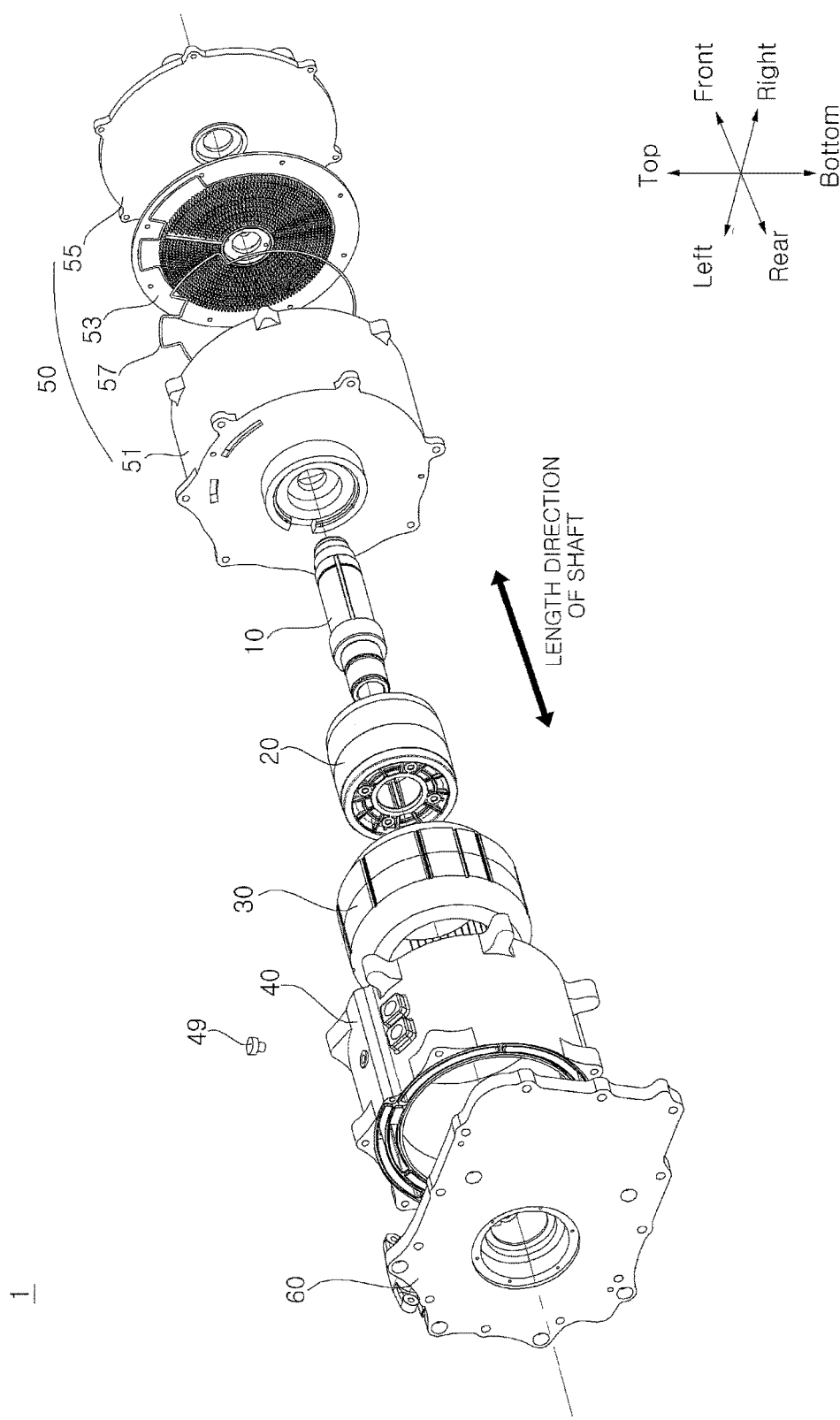
FIG. 4 is an exploded perspective view of the motor in accordance with the embodiment of the present disclosure, as seen from the other side.

With regard to a relationship between flow velocity and pressure loss, pressure loss of a fluid may be increased as the flow velocity of the fluid is increased under the same conditions. Since the widths of the second heat exchange cells 211 (of the second heat exchanger rear part 210b of the second heat exchanger 210) are greater than the widths of the second heat exchange cells 211 (of the second heat exchanger front part 210a), pressure loss of the fluid in the second heat exchanger rear part 210b is reduced. As a result, water may smoothly flow along the second heat exchanger 210. In the second heat exchanger 210 having the above described configuration, in spite of pressure loss of water flowing through the second heat exchanger front part 210a, water may flow along the second heat exchanger rear part 210b and thus effectively cool the stator 30. With reference to FIGS. 4, 10 and 11, the second flow path 200 may include second inlet 230, through which the second fluid is introduced into the second flow path 200 from the outside of the motor housing 40. The second inlet 230 may communicate with one end of the inverter heat exchanger 52. The second inlet 230 may be disposed at the upper end part of the outer circumferential surface of the motor housing 40. One end of the second inlet 230 may communicate with the second heat exchanger 210, and the other end of the second inlet 230 may communicate with the outside of the motor housing 40.

One end of the second inlet 230 may communicate with the front part of the inlet and outlet cell 211b-5, and the other end of the second inlet 230 may communicate with the outside of the motor housing 40. The second inlet 230 may be a hole extending from the outer surface of the inlet and outlet cell 211b-5 to the outside of the motor housing 40. The second inlet 230 may have a shape extending from the outer circumferential surface of the motor housing 40 in the vertical direction. The second inlet 230 may be spaced rightwards from the highest point on the outer circumferential surface of the motor housing 40 by a designated distance. The second inlet 230 may communicate with the cooling water circulation system which circulates cooling water, and water may be introduced into the second heat exchanger 210 through the second inlet 230.

The cooling water circulation system may include a cooling water pump to circulate cooling water and a radiator, which may contact outdoor air to cool the cooling water.

With reference to FIGS. 4, 10 and 11, the second flow path 200 may include the second outlet 250, through which the second fluid is discharged to the outside of the motor housing 40 from the second flow path 200. One end of the second flow path may communicate with one end of the second heat exchanger 210, the other end of which communicates with the inverter heat exchanger 52. The second outlet 250 is disposed at the upper end part of the motor housing 40, one end of the second outlet 250 may communicate with the second heat exchanger 210, and the other end of the second outlet 250 may communicate with the outside of the motor housing 40. One end of the second outlet 250 may communicate with the rear part of the inlet and outlet cell 211$b$-5, and the other end of the second outlet 250 may communicate with the outside of the motor housing 40. The second outlet 250 may be a hole extending from the outer surface of the inlet and outlet cell 211$b$-5 to the outside of the motor housing 40. The second outlet 250 may have a shape extending from the outer circumferential surface of the motor housing 40 in the vertical direction. The second outlet 250 may be spaced from the highest point on the outer circumferential surface of the motor housing 40 by a designated distance.

The second outlet 250 and the second inlet 230 may be disposed in parallel so as to be spaced apart from each other by a designated distance in the forward and backward directions. The second outlet 250 may communicate with the cooling water circulation system which circulates cooling water, and water may be discharged to the cooling water circulation system from the second heat exchanger 210 through the second outlet 250.

In the motor housing 40 having the above-described configuration, the second inlet 230 and the second outlet 250 are disposed in parallel and, thus, the motor housing 40 may be easily manufactured. Further, the motor housing 40 may be easily connected to the cooling water circulation system.

Figure 13:
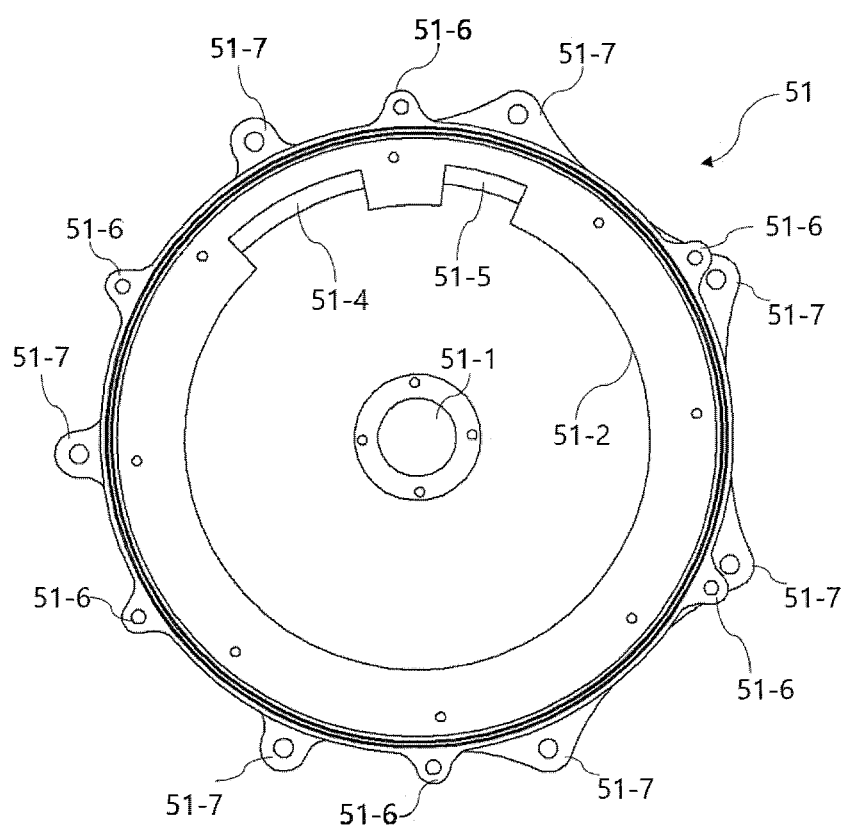
FIG. 13 is a front view of the inverter housing of FIG. 1.
Figure 14:
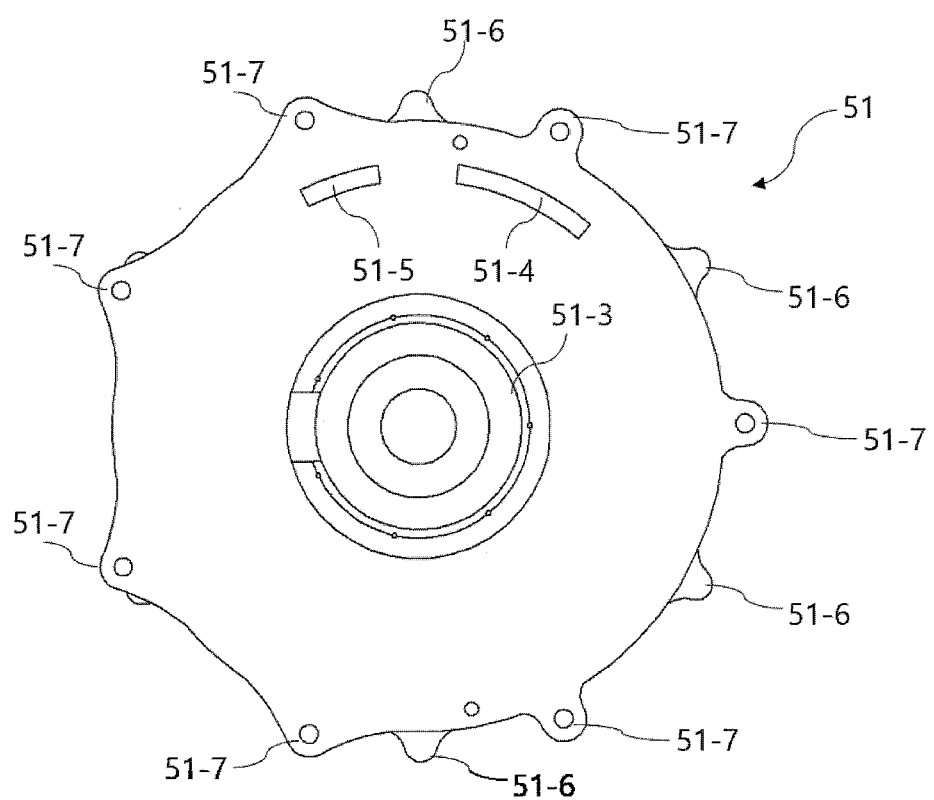
FIG. 14 is a rear view of the inverter housing of FIG. 1.

FIG. 13 is a front view of the inverter housing 51 of FIG. 1 and FIG. 14 is a rear view of the inverter housing 51 of FIG. 1. The inverter casing 50 (see FIG. 12, e.g.) may be combined with or positioned next to the motor housing 40 in the length direction of the shaft 10. The inverter casing 50 may include the inverter housing 51, an inverter heat exchange plate 53 and an inverter housing cover 55. The motor 1 may include a front cover to cover one open side surface or end of the motor housing 40.

The motor 1 may include the inverter housing 51 combined with the motor housing 40 in the length direction of the shaft 10. In this embodiment, the front cover may be the inverter housing 51 which covers one open side surface of the motor housing 40 and receives the inverter therein. In accordance with another embodiment, the motor 1 may not include the inverter housing 51 and a front cover may be provided to cover one side surface of the motor housing 40.

With reference to FIGS. 13 and 14, the inverter housing 51 may have a hollow cylindrical shape. The inverter housing 51 may have a cylindrical shape, one side of which is opened. The inverter housing 51 may be provided with a rear hole 51-1, through which the shaft 10 passes, formed on the rear part of the inverter housing 51. A part of a rear wall of the inverter housing 51 provided with the rear hole 51-1 formed therethrough may protrude forwards and thus be combined with the inverter heat exchange plate 53. The inverter heat exchange plate 53 may be inserted into the inverter housing 51 and combined with the rear wall of the inverter housing 51. A stepped portion 51-2 may be formed on the inner surface of the rear wall of the inverter housing 51 and thus guide the position of the inverter heat exchange plate 53 that is combined with the inverter housing 51. The height of the stepped portion 51-2 formed on the rear wall of the inverter housing 51 and the height of a protruding part of the inverter housing 51 around the rear hole 51-1 may be the same, thus guiding the combined position of the inverter heat exchange plate 53 when the inverter heat exchange plate 53 is combined with the inverter housing 51.

The inverter housing 51 may include an inverter housing coupling part 51-3 protruding backwards from the rear end of the inverter housing 51 and combined with the bearing of the shaft 10. The inverter housing coupling part 51-3 may have a hollow cylindrical shape. At least one stepped portion may be formed on the inverter housing coupling part 51-3 so that the bearing is effectively cooled by oil or other fluid flowing in the inner space of the motor housing 40.

A plurality of holes, through which water or other fluid is introduced into the inverter housing 51 and water is discharged to the outside of the inverter housing 51, may be formed on the rear wall of the inverter housing 51. A plurality of holes may be formed at the upper part of the rear wall of the inverter housing 51 and, thereby, the first flow path 100 and the inside of the inverter housing 51 may communicate with each other. The inverter housing 51 may be provided with the inverter housing inflow hole 51-4 communicating with the front part of the inlet and outlet cell 211$b$-5 so that water is introduced into the inverter housing 51. The inverter housing 51 may be provided with the inverter housing outflow hole 51-5 communicating with the second heat exchange cell 211$a$-1 of the second heat exchanger front part 210$a$ so that water is discharged from the inverter housing 51 and introduced into the second heat exchanger front part 210$a$. The inverter housing inflow hole 51-4 of the inverter housing 51 may be disposed at a position corresponding to the front part of the inlet and outlet cell 211$b$-5 and, thus, when the inverter housing 51 is combined with the motor housing 40, the inverter housing 51 may communicate with the inlet and outlet cell 211$b$-5. The inverter housing outflow hole 51-5 of the inverter housing 51 may be disposed at a position corresponding to the second heat exchange cell 211$a$-1 of the second heat exchanger front part 210$a$ and, thus, when the inverter housing 51 is combined with the motor housing 40, the inverter housing 51 may communicate with the second heat exchanger front part 210$a$.

The inverter housing 51 may include the inverter heat exchanger 52 along which water, introduced into the inverter housing 51, flows. With reference to FIGS. 3 and 4, the inverter housing 51 may include the inverter heat exchanger 52 formed therein to cool the inverter. The inverter heat exchanger 52 may be formed by combining the inverter housing 51 and the inverter heat exchange plate 53. A part of a flow path of the inverter heat exchanger 52 may be formed by the inverter housing 51 and the remaining part of the flow path of the inverter heat exchange 52 may be formed by the inverter heat exchange plate 53. The inverter heat exchanger 52 may be provided such that the second fluid introduced into the inverter heat exchanger 52 is rotated in the circumferential direction of the shaft 10.

In an embodiment, the inverter heat exchanger 52 may be provided such that water introduced into the inverter heat exchanger 52 is rotated in the counterclockwise direction, as the inverter housing 52 is seen from the front.

Figure 15:
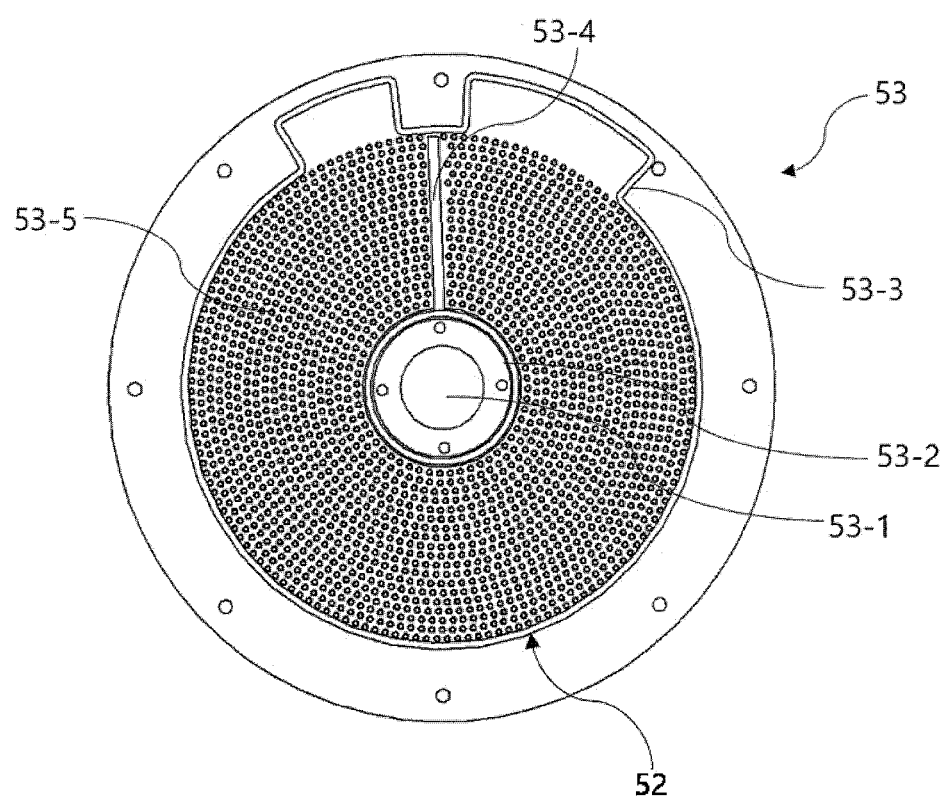
FIG. 15 is a rear view of an inverter heat exchange plate of FIG. 1.

FIG. 15 is a rear view of the inverter heat exchange plate 53 of FIG. 1.

The inverter housing 51 may include the inverter heat exchange plate 53 combined with the inside of the inverter housing 51 and provided with a plurality of heat exchange fins. The inverter heat exchange plate 53 may be combined with the inverter housing 51, thus forming the inverter heat exchanger 52 With reference to FIGS. 3, 4 and 15, a central hole 53-1 is formed through the inverter heat exchange plate 53.

The inverter heat exchange plate 53 may be formed in a disc shape having a diameter corresponding to the inner diameter of the inverter housing 51, be inserted into the inner circumferential surface of the inverter housing 51, and thus be closely adhered to the inverter housing 51. The inverter heat exchange plate 53 may be provided with a plurality of coupling holes formed at the edge thereof and thus be combined with the inverter housing 51 through the coupling holes. The inverter heat exchange plate 53 may be provided with a plurality of coupling holes formed around the central hole 53-1 and thus be combined with the inverter housing 51. The inverter heat exchange plate 53 may be provided with a protrusion 53-2 formed on the rear surface thereof facing the rear wall of the inverter housing 51 and be spaced apart from the central hole 53-1 by a designated distance. The protrusion 53-2 may have a circular band shape having a designated thickness. The inverter heat exchange plate 53 may be coupled with the inverter housing 51 by inserting the protruding part surrounding the rear hole 51-1 of the inverter housing 51 into the protrusion 53-2 and, thus, coupling force between the inverter heat exchange plate 53 and the inverter housing 51 may be reinforced.

The inverter heat exchange plate 53 may be provided with an O-ring coupling groove 53-3 formed on the rear surface thereof so that an inverter housing O-ring is coupled with the O-ring coupling groove 53-3. The O-ring coupling groove 53-3 may be formed to have a shape corresponding to the shape of the inverter housing O-ring 57 so that a part of the inverter housing O-ring 57 is inserted into the O-ring coupling groove 53-3. The O-ring coupling groove 53-3 having a shape corresponding to the inverter housing inflow hole 51-4 and the inverter housing outflow hole 5105 may be formed on the rear surface of the inverter heat exchange plate 53. The inverter heat exchange plate 53 may be provided with a protruding wall 53-4, formed on the rear surface of the inverter heat exchange plate 53, extending from the top of the protrusion 53-2 to the O-ring coupling groove 53-3 and having a designated thickness.

The inverter heat exchange plate 53 may guide flow of water introduced into the inverter heat exchanger 52 in the counterclockwise direction by the protruding wall 53-4 extending upwards from the protrusion 53-2. The inverter heat exchange plate 53 may be provided with a plurality of cooling fins 53-5 disposed within a designated distance from the outside of the protrusion 53-2 on the rear surface of the inverter heat exchange plate 53. The cooling fins 53-5 may have a cylindrical shape protruding backwards from the rear surface of the inverter heat exchange plate 53.

The cooling fins 53-5 may have a cylindrical shape, the diameter of which is decreased in the backward direction from the rear surface of the inverter heat exchange plate 53, and, thus, durability of the cooling fins 53-5 may be improved. The cooling fins 53-5 may be disposed in a zigzag shape based on the radial direction of the inverter heat exchange plate 53 and may thus effectively exchange heat with the cooling fluid flowing in the inverter heat exchanger 52.

In the inverter heat exchanger 52 having the above-described configuration, a contact area between water flowing in the inverter heat exchanger 52 and the inverter heat exchange plate 53 is broad or large and, thus, the inverter heat exchange plate 53 may be effectively cooled.

The inverter housing 51 may be provided with a plurality of front fastening parts 51-6 protruding from the front end of the outer circumferential surface thereof to the outside of the inverter housing 51 so as to be combined with the inverter housing cover 55. The front fastening parts 51-6 may be arranged so as to be bilaterally symmetrical.

The inverter housing 51 may be provided with a plurality of rear fastening parts 51-7 protruding from the rear end of the outer circumferential surface thereof to the outside of the inverter housing 51 so as to be combined with the inverter housing 51. In order to improve fastening force of the left part of the motor housing 40 provided with the first flow path 100 and the second flow path 200, a larger number of the rear fastening parts 51-7 may be arranged at the left part of the inverter housing 51 than the right part of the inverter housing 51. According to embodiments, the rear fastening parts 51-7 may be arranged so as to be bilaterally symmetrical. The rear fastening parts 51-7 have a rib shape and, thus, broad connection regions of the rear fastening parts 51-7 to the inverter housing 51 are formed and durability of the inverter housing 51 may be improved.

The inverter housing 51 may be combined with the motor housing 40 and thus form the first flow path 100 and the second flow path 200. The inverter housing 51 and the rear cover 60 may be combined with the motor housing 40 and thus form the first flow path 100 and the second flow path 200. The inverter housing 51 may receive the inverter therein and thus protect the inverter from foreign substances or external impact. The inverter housing 51 may be combined with the inverter housing cover 55 in the length direction of the shaft 10. The inverter housing 51 may be combined with the motor housing 40 in the length direction of the shaft 10.

The inverter housing cover 55 may be combined with the opened front part of the inverter housing 51. The inverter housing cover 55 may have a disc shape having an outer diameter corresponding to the outer circumferential surface of the inverter housing 51. The inverter housing cover 55 may be provided with fastening parts protruding outwards from the outer circumferential surface thereof and thus be combined with the inverter housing 51 by or using the fastening parts. The inverter housing cover 55 may be provided with one or more holes, through which wirings to conductively connect the inverter and devices at the outside of the motor 1 pass. The inverter casing 50 may include the inverter housing O-ring 57 interposed between the inverter heat exchange plate 53 and the inverter housing 51 to improve sealing ability therebetween. The inverter housing O-ring 57 may prevent the cooling fluid from leaking into the inverter housing 51 and thus damaging other members, such as the inverter. The inverter housing O-ring 57 may be interposed between the inverter housing 51 and the inverter heat exchange plate 53. At least a part of the inverter housing O-ring 57 may be inserted into the O-ring coupling groove 53-3 of the inverter heat exchange plate 53. The inverter housing O-ring 57 may be formed of an elastic material, such as rubber, and be interposed between members, thus improving adhesion force therebetween.

Figure 16:
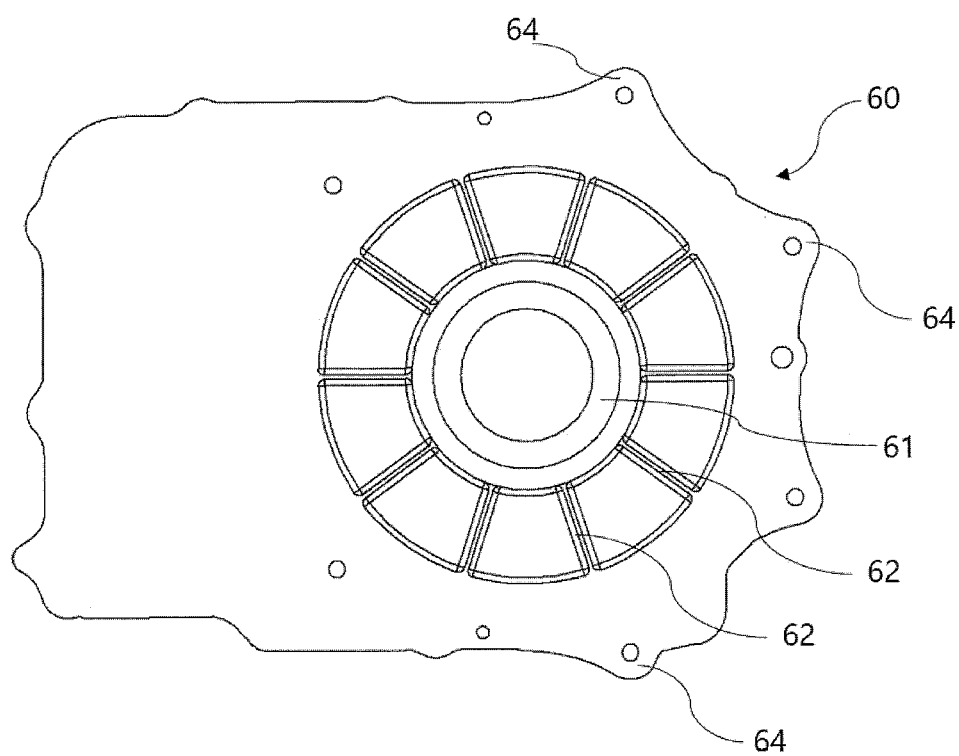
FIG. 16 is a front view of a rear cover of FIG. 1.
Figure 17:
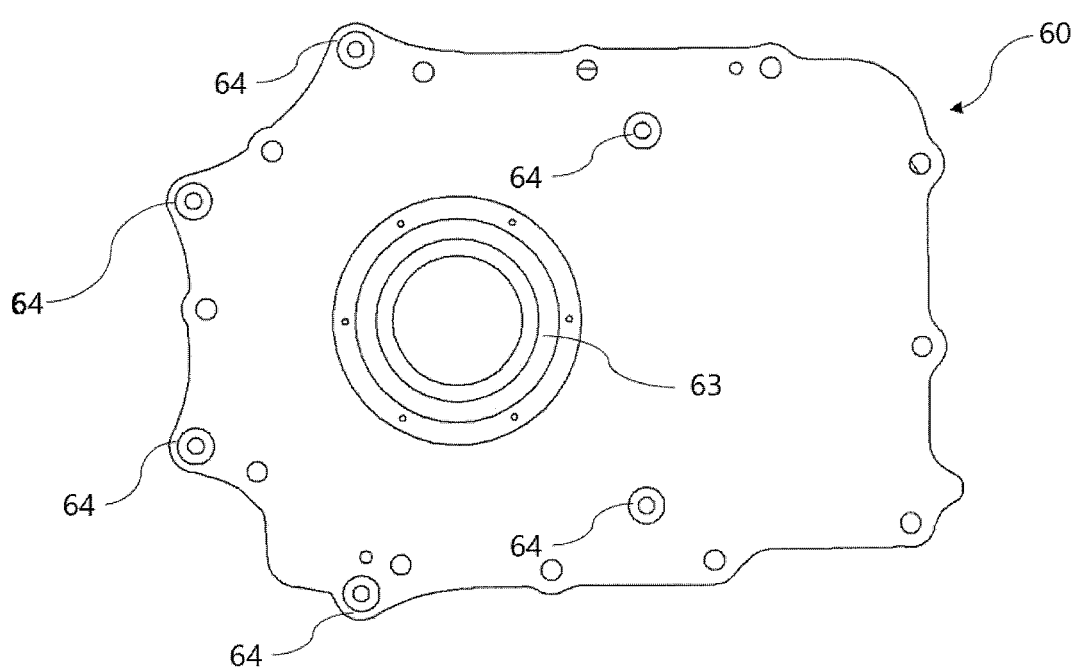
FIG. 17 is a rear view of the rear cover of FIG. 1.

FIG. 16 is a front view of the rear cover 60 of FIG. 1, and FIG. 17 is a rear view of the rear cover 60 of FIG. 1.

With reference to FIGS. 1, 4, 16 and 17, the motor 1 may include the rear cover 60 to cover the other open side surface of the motor housing 40 opposite the side surface of the motor housing 40 covered by the front cover. The rear cover 60 may be combined with the rear part of the motor housing 40 in the length direction of the shaft 10. The front cover and the rear cover 60 may be combined with the motor housing 40 and thus collectively form the first flow path 100 and the second flow path 200. The rear cover 60 may have an external appearance corresponding to the protruding part of the motor housing 40 and, thus, coupling force of the rear cover 60 with the motor housing 40 may be improved. The rear cover 60 may be formed to have various shapes, i.e., any shape corresponding to a place or portion of a main body, with which the motor 1 is combined. The rear cover 60 may be provided with a rear cover prominence 61 protruding from a surface of the rear cover 60 facing the motor housing 40 toward the motor housing 40. The rear cover prominence 61 may have a cylindrical shape having a hole formed at the center thereof and one or more stepped portions. The rear cover 60 may be provided with a plurality of fan-shaped recesses formed from the edge of the rear cover prominence 61 to a region spaced from the center of the hole by a designated distance. The rear cover 60 may be provided with a plurality of protruding ribs 62 between the fan-shaped recesses. The fan-shaped recess may be formed by a pair of the protruding ribs 62 and the edge of the rear cover prominence 61.

The protruding ribs 62 may extend from the edge of the rear cover prominence 61 to the region spaced from the center of the hole by the designated distance, in the radial direction of the rear cover prominence 61.

In this embodiment, the protruding ribs 62 and the fan-shaped recesses may be provided so as to be top-and-bottom symmetrical and bilaterally symmetrical.

If the motor 1 having the above-described configuration is operated under the condition that the rear cover 60 are combined with the motor housing 40 and oil flows in the inner space of the motor housing 40 due to rotation of the motor 1, oil is scattered or dispersed within the motor housing 40 by the rear cover 60 provided with the protruding ribs 62 and the fan-shaped recesses and may thus effectively function as a lubricant. Further, in the motor 1, oil may effectively cool members in the motor housing 40, such as the stator 30, the motor 20, the coils 33, etc.

The rear cover 60 may be provided with a rear cover depression 63 (see FIG. 17 e.g.) formed as a depressed hole having one or more stepped portions at a position on the rear surface of the rear cover 60 corresponding to the rear cover prominence 61. The rear cover 60 may be provided with a plurality of fastening parts 64 to be combined with the motor housing 40. The rear cover 60 may be provided with a plurality of hole-shaped fastening parts to be combined with the main body, with which the motor 1 is combined.

The motor 1 may include an O-ring 70 (see FIG. 12 e.g.) interposed between the motor housing 40 and the inverter housing 51. The motor 1 may include an O-ring 70 interposed between the motor housing 40 and the rear cover 60. The O-rings 70 may be formed of an elastic material, such as rubber, and be interposed between the members, thus improving adhesion force therebetween. The O-rings 70 may have a shape corresponding to the shape of the first flow path 10 and the second flow path 20, which are open to one end of the motor housing 40, and may prevent the fluids from leaking to the outside of the motor 1 when the inverter housing 51 and the rear cover 60 are combined with the motor housing 40. In the motor housing 40, the edge parts of the first flow path 100 and the second flow path protrude to the outside of the motor housing 40 by a designated length and are inserted into grooves formed on the O-rings 70, thus effectively preventing leakage of the first fluid and the second fluid.

The motor 1 may include a pump communicating with the first flow path 100 and providing flow pressure to circulate the first fluid. The pump may be the oil pump 80. In an embodiment, one pump may be disposed at the left side of the motor housing 40. A pair of pumps may be disposed at the left and right sides of the motor housing 40 and provide flow pressure to the first heat exchanger 110.

The motor 1 may be designed such that, if an external temperature value of the motor 1 is a predetermined temperature value or above, the first fluid flows to the first flow path 100. The motor 1 may be designed such that, if viscosity of the first fluid is below a predetermined value, the first fluid flows to the first flow path 100. The motor 1 may be provided with one or more sensors to sense an external temperature of the motor 1. The motor 1 may be provided with one or more sensors to sense viscosity of the first fluid in the first flow path 100. The predetermined values of the motor 1 may be set according to kind or type of the first fluid. The motor 1 may be designed such that, when the motor 1 is operated, the second fluid flows to the second flow path 200. The motor 1 may be designed such that, if output of the motor 1 is a predetermined value or above, the first fluid flows to the first flow path 100. The motor 1 having the above-described configuration controls the first fluid to selectively flow into the first flow path 100 and, thus, efficiency of the motor 1 may be improved.

Further, unnecessary operation of the motor 1 is reduced and, thus, durability of the motor 1 may be improved.

Figure 18:
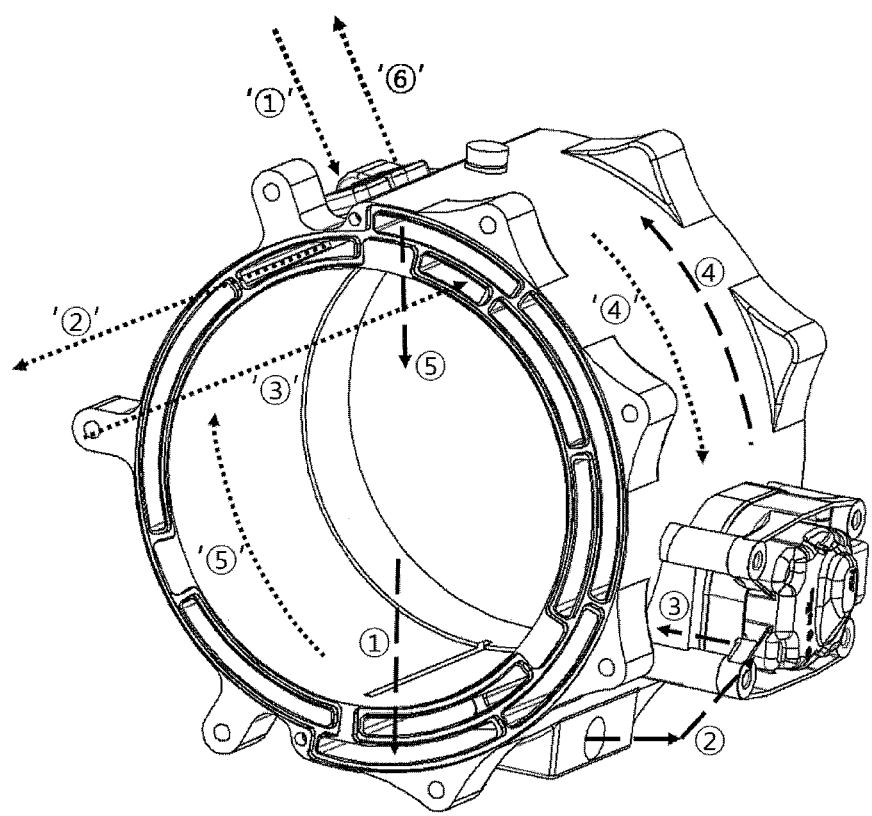
FIG. 18 is a view illustrating flows in a first flow path and a second flow path in an embodiment of the disclosure.

FIG. 18 is a diagram illustrating flows in the first flow path 100 and the second flow path 200. Functions and effects of the motor 1 in accordance with this embodiment will be described with reference to FIG. 18.

In the first flow path 100, oil is introduced from the inner space of the motor housing 40 into the first heat exchanger 110 through the first inlet 130 (①). In the first flow path 100, oil introduced into the lowermost first heat exchange cell 111-1 of the first heat exchanger 110 is discharged to the oil pump 80 through the intake path 42 (②).

In the first flow path 100, oil, which is inhaled into the oil pump 80 and thus has raised or elevated flow pressure, is introduced into the first heat exchange cell 111-2 of the first heat exchanger 110 through the discharge path 43 (③). In the first flow path 100, oil introduced into the first heat exchange cell 111-2 flows along the first heat exchanger 110 and is introduced into the uppermost first heat exchange cell 111-5 (④)

That is, in the first flow path 100, oil introduced into the first heat exchange cell 111-2 is introduced into the first heat exchange cell 111-3 through the first heat exchange connection path 113-1, oil introduced into the first heat exchange cell 111-3 is introduced into the first heat exchange cell 111-4 through the first heat exchange connection path 113-2, and oil introduced into the first heat exchange cell 111-4 is introduced into the uppermost first heat exchange cell 111-5 through the first heat exchange connection path 113-3. In the first flow path 100, oil introduced into the uppermost first heat exchange cell 111-5 is discharged to the inner space of the motor housing 40 through the first outlets 150 (⑤). Thereafter, in the first flow path 100, oil is introduced again into the first heat exchanger 110 from the inner space of the motor housing 40 and Operations ① to ⑤ are repeated.

In the second flow path 200, water is introduced from the cooling water circulation system into the inlet and outlet cell 211b-5 of the second heat exchanger 210 through the second inlet 230 ('①'). In the second flow path 200, water introduced into the front part of the inlet and outlet cell 211b-5 is discharged to the inverter heat exchanger 52 ('②'). In the second flow path 200, water introduced into the inverter heat exchanger 52 cools the inverter while flowing along the inverter heat exchanger 52, and is then introduced into the uppermost second heat exchange cell 211a-1 of the second heat exchanger front part 210a of the second heat exchanger 210 ('③').

In the second flow path 200, water introduced into the uppermost second heat exchange cell 211a-1 flows along the second heat exchanger front part 210a and is then introduced into the second heat exchanger rear part 210b of the second heat exchanger 210 ('④@').

That is, in the second flow path 200, water introduced into the second heat exchange cell 211a-1 is introduced into the second heat exchange cell 211a-2 through the second heat exchange connection path 213a-1, water introduced into the second heat exchange cell 211a-2 is introduced into the second heat exchange cell 211a-3 through the second heat exchange connection path 213a-2, water introduced into the second heat exchange cell 211a-3 is introduced into the second heat exchange cell 211a-4 through the second heat exchange connection path 213a-3, water introduced into the second heat exchange cell 211a-4 is introduced into the second heat exchange cell 211a-5 through the second heat exchange connection path 213a-4, water introduced into the second heat exchange cell 211a-5 is introduced into the second heat exchange cell 211a-6 through the second heat exchange connection path 213a-5, and water introduced into the second heat exchange cell 211a-6 is introduced into the second heat exchange cell 211a-7 through the second heat exchange connection path 213a-6.

In the second flow path 200, water introduced into the second heat exchange cell 211a-7 is introduced into the lowermost second heat exchange cell 211b-1 of the second heat exchanger rear part 210b of the second heat exchanger 210 through the second heat exchange connection path 213a-7.

In the second flow path 200, water introduced into the lowermost second heat exchange cell 211b-1 of the second heat exchanger rear part 210b flows along the second heat exchanger rear part 210b and is introduced into the inlet and outlet cell 211b-5 ('⑤').

That is, in the second flow path 200, water introduced into the second heat exchange cell 211b-1 is introduced into the second heat exchange cell 211b-2 through the second heat exchange connection path 213b-1, water introduced into the second heat exchange cell 211b-2 is introduced into the second heat exchange cell 211b-3 through the second heat exchange connection path 213b-2, water introduced into the second heat exchange cell 211b-3 is introduced into the second heat exchange cell 211b-4 through the second heat exchange connection path 213b-3, and water introduced into the second heat exchange cell 211b-4 is introduced into the rear part of the inlet and outlet cell 211b-5 through the second heat exchange connection path 213b-4.

In the second flow path 200, water introduced into the rear part of the inlet and outlet cell 211b-5 is discharged through the second outlet 250 and is introduced into the cooling water circulation system ('⑥'). Thereafter, in the second flow path 200, water is introduced again into the second heat exchanger 110 from the cooling water circulation system and Operations '①' to '⑥' are repeated.

In the motor 1 having the above-described configuration, oil passes through the first heat exchanger 110, is cooled through heat exchange with the second heat exchanger 210 and is then discharged again to the inside of the motor housing 40, thereby effectively cooling devices received in the motor housing 40, such as the rotor 20, the stator 30, etc. Further, in the motor 1, water cooled by the cooling water circulation system may effectively cool the inverter, the stator 30 in the motor housing 40 and oil in the first flow path 100.

Further, in the motor 1, the flow paths 100 and 200 may be designed in consideration of characteristics of cooling fluids, i.e., water and oil for example, and, thus, heat exchange between water and oil may be effectively carried out.

Further, the motor 1 may be designed such that oil e.g. flows to the first flow path 100 according to an external temperature and/or viscosity of the first fluid (oil). Such provides selective use of oil cooling according to the particular situation, thereby providing effective operation.

Moreover, an effective structure in which the motor 1 is cooled using a direct cooling method using oil and an indirect cooling method using water may be provided.

As apparent from the above description, a motor in accordance with one embodiment of the present disclosure may have at least one of advantages described below.

First, the motor has a cooling structure including a first flow path to circulate a first fluid and a second flow path to circulate a second fluid and may thus be effectively cooled.

Second, cooling performance of the motor is improved and, thus, performance of the motor, i.e., continuous output (continuous output ratio) and maximum output (coil designed current density), may be improved and durability of the motor may be improved.

Third, for example, if the first fluid is oil and the second fluid is cooling water flowing along a cooling water circulation system outside the motor, cooling water having a relatively high temperature supplies heat to oil having a relatively low temperature under low temperature conditions and, thus, oil may smoothly flow along the first flow path and cool the motor.

An object of the present disclosure is to provide a structure of a motor having improved cooling performance, as compared to conventional motors. Another object of the present disclosure is to provide a structure of a motor having improved performance and durability. Yet another object of the present disclosure is to provide a motor which may be stably operated even at a low temperature.

The objects of the present disclosure are not limited to the above-mentioned objects and other objects that have not been mentioned above will become evident to those skilled in the art from the following description.

To achieve the above and other objects, there is provided a motor including a shaft, a rotor, a motor housing forming an inner space to receive the shaft and the rotor therein, a stator received in the motor housing and disposed outside the rotor based on a radial direction of the shaft, a first flow path disposed outside the stator based on the radial direction of the shaft such that a first fluid flows in the first flow path, the first fluid being discharged to the inner space and cooling the stator and the rotor, and a second flow path disposed between the first flow path and the stator based on the radial direction of the shaft such that a second fluid flows in the second flow path, the second fluid absorbing heat of the stator transferred through a flow path wall.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
   a motor assembly having
   a stator to rotate a rotor, the being coupled to a shaft;
   a housing including an inner space to receive the motor assembly;
   a first flow path provided at least in part outside the stator to allow first fluid to flow in the first flow path, and to discharge into the inner space for cooling the stator and the rotor; and
   a second flow path provided at least in part between the first flow path and the stator to allow second fluid to flow in the second flow path and to absorb heat of the stator transferred through a flow path wall,
   wherein:
   the housing having a cylindrical shape with the inner space formed therein;
   the second flow path includes a second heat exchanger formed between an inner circumferential surface and an outer circumferential surface of the housing, a second heat exchanger to exchange heat with the stator; and
   the first flow path includes a first heat exchanger formed between the second heat exchanger and the outer circumferential surface of the housing, and the first heat exchanger to exchange heat with the second heat exchanger,
   wherein the second heat exchanger includes:
   a plurality a second heat exchange cells arranged in a circumferential direction of the housing; and
   a plurality of second heat exchange connection paths each separately located at one of two ends of the housing and connecting neighboring second heat exchange cells to each other, and
   wherein:
   the second heat exchange connection paths alternately connect first ends and second ends of the second heat exchange cells to each other based on a length direction of the shaft, and such that a flow direction of the second fluid in the second heat exchanger is alternately changed between a first direction and a second direction, and a width of the second heat exchange connection paths is smaller than a width of the second heat exchange cells, wherein the first heat exchanger includes:
a plurality of first heat exchange cells arranged in the circumferential direction of the housing; and
a plurality of first heat exchange connection paths each separately located at one of two ends of the housing and connecting neighboring first heat exchange cells to each other, and
wherein:
the first heat exchange connection paths alternately connect first ends and second ends of the first heat exchange cells to each other based on the length direction of the shaft, and such that a flow direction of the first fluid in the first heat exchanger is alternately changed between a third direction and a fourth direction; and
a width of the first heat exchange connection paths is smaller than a width of the first heat exchange cells,
wherein the second heat exchanger includes a second heat exchanger front part that is overlapped with the first heat exchanger and a second heat exchanger rear part located so as not to overlap the first heat exchanger, based on a radial direction of the shaft,
wherein the second fluid introduced into the second heat exchanger front part passes through the second heat exchanger rear par and is then discharged to the outside of the housing,
wherein the second heat exchanger is configured such that the number of changes in flow direction of the second fluid in a part of the second heat exchanger covered by the first heat exchanger differs from the number of changes in flow direction of the first fluid in the first heat exchanger based on the length direction of the shaft, and
wherein widths of the second heat exchange cells of the second heat exchanger front part are smaller than widths of the second heat exchange cells of the second heat exchanger rear part, based on the circumferential direction of the housing.

2. The motor according to claim 1, further comprising:
a front cover configured to cover a first open side of the housing, and
a rear cover configured to cover a second open side of the housing opposite the first open side of the housing, and
wherein the first flow path and the second flow path are formed by combining the front cover and the rear cover with the housing.

3. The motor according to claim 1, wherein the housing is configured such that a thickness of a first diaphragm between the first heat exchanger and the second heat exchanger and a thickness of a second diaphragm between the inner circumferential surface of the hosing and the second heat exchanger, based on a radial direction of the shaft, are different.

4. The motor according to claim 1, further comprising an inverter housing combined with the housing, in the length direction of the shaft, to provide an inverter heat exchanger to cool an inverter provided in the inverter housing, and
wherein:
the second flow path includes a second inlet allowing the second fluid to be introduced into the second flow path from the outside of the housing and a second outlet allowing the second fluid to be discharged to the outside of the housing from the second flow path; and
one end of the inverter heat exchanger communicates with one end of the second heat exchanger, and an other end of the second heat exchanger communicates with the second outlet.

5. The motor according to claim 4, wherein:
the inverter housing further includes an inverter heat exchange plate disposed inside of the inverter housing and provided with a plurality of heat exchange fins; and
the inverter heat exchanger is formed by combining the inverter heat exchange plate with the inverter housing and configured such that the second fluid introduced into the inverter heat exchanger is rotated in a circumferential direction of the shaft.

6. The motor according to claim 1, wherein the first flow path is configured such that a ratio of an area of the inner circumferential surface of the housing covered by the second heat exchanger to an area of the inner circumferential surface of the housing covered by the first heat exchanger to an area of the inner circumferential surface of the housing covered by the first heat exchanger based on a circumferential direction of the shaft is 1:0.3-0.7.

7. The motor according to claim 1, wherein the first heat exchanger is provided such that at least some of the first heat exchange cells overlap the second heat exchange cells based on a radial direction of the shaft.

8. The motor according to claim 1, wherein the first flow path includes:
a first inlet, arranged between the plurality of second heat exchange cells, that allows the first heat exchanger and the inner space to communicate with each other so that the first fluid is introduced into the first flow path from the inner space; and
a first outlet allowing the first heat exchanger and the inner space to communicate with each other so that the first fluid is discharged to the inner space from the first flow path.

9. The motor according to claim 1, wherein the first flow path includes a first inlet allowing the first fluid to be introduced into the first flow path from the inner space, and a first outlet allowing the first fluid to be discharged to the inner space from the first flow path;
wherein the second heat exchanger front part is configured such that the second fluid introduced into one of the second heat exchange cells, adjacent to the first outlet, passes through the second heat exchange cell adjacent to the first inlet and is then discharged to the second heat exchanger rear part.

10. The motor according to claim 9, wherein a width of the second heat exchange cell of the second exchanger front part adjacent to the first outlet is smaller than a width of the second heat exchange cell of the second heat exchanger front part adjacent to the first inlet.

11. The motor according to claim 1, further comprising a pump communicating with the first flow path and providing flow pressure to circulate the first fluid,
wherein the housing includes:
an intake path provided with one end communicating with one of the first heat exchange cells and the other end extending to the outside of the housing and communicating with an inlet of the pump; and
a discharge path extending to the outside of the housing and communicating with an outlet of the pump.

12. The motor according to claim 1, wherein the motor is configured such that, if an external temperature value is a predetermined temperature value or above or if viscosity of the first fluid is below a predetermined value, the first fluid flows to the first flow path.

13. The motor according to claim 1, wherein the first direction is parallel to the second direction, the second direction is parallel to the third direction, the third direction is parallel to the fourth direction, and the fourth direction is parallel to the first direction.

\* \* \* \* \*